US012163363B2

(12) United States Patent
Kicher

(10) Patent No.: US 12,163,363 B2
(45) **Date of Patent: *Dec. 10, 2024**

(54) DIRECT DRIVE COUNTER BALANCING SYSTEM FOR OVERHEAD DOORS

(71) Applicant: ENGINEERED HARDWARE, LLC, Mentor, OH (US)

(72) Inventor: Paul T. Kicher, Waite Hill, OH (US)

(73) Assignee: Engineered Hardware, LLC, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,084

(22) Filed: Jun. 13, 2023

(65) Prior Publication Data

US 2023/0323716 A1 Oct. 12, 2023

Related U.S. Application Data

(63) Continuation of application No. 17/174,873, filed on Feb. 12, 2021, now Pat. No. 11,713,606.

(60) Provisional application No. 63/026,395, filed on May 18, 2020, provisional application No. 63/024,215, filed on May 13, 2020, provisional application No. 63/023,312, filed on May 12, 2020, provisional application No. 62/976,727, filed on Feb. 14, 2020.

(51) Int. Cl.
*E05D 13/00* (2006.01)

(52) U.S. Cl.
CPC .................................... *E05D 13/12* (2013.01)

(58) Field of Classification Search
CPC ...................................................... E05D 13/12
See application file for complete search history.

(56) References Cited

U.S. PATENT DOCUMENTS 2,633,353 A 3/1953 Meek
4,252,172 A 2/1981 Pommat et al.
6,983,785 B2 1/2006 Altimore
7,537,042 B2 5/2009 Altimore
8,025,090 B2 9/2011 Kicher
9,156,151 B2 10/2015 Kicher et al.
2005/0082015 A1 4/2005 Altimore
2007/0137801 A1 6/2007 Kicher
2009/0044917 A1 2/2009 Meichtry
(Continued)

FOREIGN PATENT DOCUMENTS

CA 2890825 A1 6/2014
CN 209855615 U 12/2019
(Continued)

OTHER PUBLICATIONS

Examination Report for Canadian Patent Application No. 3,167,192 dated Oct. 27, 2023, 10 pages.
(Continued)

*Primary Examiner* — Janet M Wilkens
*Assistant Examiner* — Daniel Alvarez
(74) *Attorney, Agent, or Firm* — Hahn Loeser & Parks LLP

(57) ABSTRACT

The present disclosure is directed to overhead doors and overhead door operation. More specifically, the present disclosure relates to a direct drive counter balancing system for operating overhead doors. In some examples, the direct drive counter balancing system of the present disclosure is for overhead door systems used in segmented door arrangements for box trucks.

14 Claims, 12 Drawing Sheets

(56) References Cited

U.S. PATENT DOCUMENTS

| | | | |
|---|---|---|---|
| 2010/0037528 | A1 | 2/2010 | Lambright |
| 2011/0308744 | A1 | 12/2011 | Kicher |
| 2012/0043865 | A1 | 2/2012 | Newkirk et al. |
| 2013/0019533 | A1 | 1/2013 | Fletcher et al. |
| 2015/0083348 | A1 | 3/2015 | Szczygielski |
| 2015/0308175 | A1 | 10/2015 | Wachtell et al. |
| 2015/0337594 | A1 | 11/2015 | Bogataj et al. |
| 2020/0339395 | A1 | 10/2020 | Kicher et al. |

FOREIGN PATENT DOCUMENTS

| | | | | |
|---|---|---|---|---|
| DE | 102005057385 | A1 | 5/2007 | |
| DE | 102005057385 | B4 * | 11/2012 | ................ B60J 5/14 |
| EP | 1630336 | A1 | 3/2006 | |
| EP | 1887177 | A2 | 2/2008 | |
| FR | 2672079 | A1 | 7/1992 | |

OTHER PUBLICATIONS

International Search Report and Written Opinion in International Patent Application PCT/US2021/017843 dated Apr. 22, 2021, 16 pages.
Extended European Search Report for European Patent Application No. 21753179.7 dated Jan. 31, 2024, 9 pages.
Examination Report for CA3167192 dated Jun. 26, 2024, 8 pages.

* cited by examiner

DIRECT DRIVE COUNTER BALANCING SYSTEM FOR OVERHEAD DOORS

This patent application claims priority to and benefit of U.S. Provisional Application No. 62/976,727, filed Feb. 14, 2020, U.S. Provisional Application No. 63/023,312, filed May 12, 2020, U.S. Provisional Application No. 63/024,215, filed May 13, 2020, and U.S. Provisional Application No. 63/026,395, filed May 18, 2020, which are all incorporated herein by reference.

TECHNICAL FIELD

This disclosure relates to overhead doors and overhead door operation. More specifically, the present disclosure relates to a direct drive counter balancing system for operating overhead doors. In some examples, the direct drive counter balancing system of the present disclosure is for overhead door systems used in segmented door arrangements for box trucks.

BACKGROUND

Most overhead door systems rely on torsion spring systems as a counter balance for the operation of the overhead door. An example of a torsion spring system is a system which relies on a helical spring. Torsion spring systems operate by securing one end of the helical spring to a door shaft and another end of the helical spring to the door opening, or framed structure. The helical spring is preloaded during the installation process. The preloading provides the torque to counter balance or offset the opposing torsion produced on the shaft by the action of the weight through the radius of the door drum. The overhead door is connected to the helical spring by way of cable(s) spooled about a door drum system. Cable(s) wind about the drum(s) of the door drum system to facilitate raising and lowering the door. The door drum system is further secured to the shaft which rotates. The drum(s) of the door drum system rotate with the shaft driven by way of the helical spring and the cable(s). When the overhead door is being opened, the shaft rotates to wind the cables about the drums. The torque provided by the torsion spring system assists with lifting the weight of the door when releasing its stored energy. When the overhead door is being closed, the cable unwinds from the drum. The torque provided by the helical spring offsets the weight of the door as it is reloaded with energy for the next lifting operation.

Torsion spring systems are susceptible to fatigue. As used herein, fatigue is the weakening of the helical spring caused by cyclical loading that results in progressive and localized structural damage and even material cracks. As a result of fatigue, sudden and unpredictable failure of the helical spring may occur. Such a failure may present a danger to an operator and, at least, may prevent a door from operating at all. Therefore, helical springs require a continuous maintenance schedule to avoid such sudden and unpredictable failures. Additionally, preloading the torsion spring system of an overhead door system may also be difficult and dangerous, requiring attention and/or assistance of professionals.

In a torsion spring system, a cable winds and spools about a door drum. It is only by way of coordination between the torsion spring system and the door drum arrangement that the appropriate counter balance, or counter balance force, is achieved. Such a cable arrangement is susceptible to space constraints or the movement of a drum. Accordingly, wound and spooled cables, where the cables are wound or spooled up on, and are backed off of, a cable drum, require adequate space for the operation of an overhead door system.

Other counter balance systems have been created as an alternative to the torsion spring system. By example, gas spring arrangements have been provided to replace helical springs. An example of a gas spring counter balance system is found in U.S. Pat. Nos. 6,983,785 and 7,537,042 to Altimore and U.S. Pat. No. 8,025,090 to Kicher, the contents of which are incorporated herein by reference in their entirety for this purpose. These other counter balance systems, however, do not overcome the comments regarding wound and/or spooled cables, because they still require a shaft, door drum, and/or drive drum.

All of the deficiencies of the current overhead door systems, as noted above, are only amplified in the operation of an overhead door found in a box truck, such as a segmented door for a box truck, where use is continuous and cycle counts occur at a high rate. Box truck segmented doors undergo constant use over short periods of time. The limited life of operation of prior systems have significant impact on box truck operators. To avoid breakdowns, while a box truck is in use, box trucks may be taken out of operation based upon pre-determined lifespans of the counter balance system and/or the overhead door system. This downtime results in significant loss of profit while a box truck undergoes routine replacement and/or maintenance of the prior systems. This downtime, however, pales in comparison to the expense and downtime that may occur if the system were to fail while a box truck is on a route or in operation.

In view of this, what is needed is a counter balance system for an overhead door system that is a direct drive system, that reduces, eliminates, or is not susceptible to fatigue, that provides a more controlled motion to the door, and that improves damping control. What is also needed is a counter balance system that extends the operational life span (e.g., cycle count) of the overhead door system in comparison to systems currently on the market. More specifically, what is also needed is an improved counter balance system for use on segmented doors that experience high cycle use such as, for example, segmented doors used with box trucks.

SUMMARY

The present disclosure relates to overhead doors and overhead door operation. More specifically, the present disclosure relates to a direct drive counter balancing system for operating overhead doors. In some examples, the direct drive counter balancing system of the present disclosure is for overhead door systems used on segmented door arrangements for box trucks.

In one example of a counter balance system for an overhead door assembly, the counter balance system comprises a gas spring, at least a first sheave, at least a second sheave, and at least a cable. A first end of the gas spring is fixed to, or is configured to be fixed to, an overhead door system, or assembly, and a second end moves relative to, or is configured to move relative to, the overhead door system, or assembly. The first sheave may be secured to, or be adjacent to, the first end of the gas spring and is a directional sheave. The second sheave may be secured to the second end of the gas spring and move with the gas spring and is, thereby, an amplifying sheave. The cable is secured to, or is operably connected to, or is configured to be secured to, or is configured to be operably connected to, the overhead door and the gas spring through a direct drive system. In an example of the direct drive system a cable arrangement is provided where the cable is operably connected directly to a compound pulley system and the first and second sheaves of the gas spring to provide, or configured to provide, a counter balance, or counter balance force, to the overhead door system, or assembly.

In examples of the counter balance system for an overhead door system, or assembly, the counter balance system does not include a torsion spring, or helical spring. In examples of the counter balance system for an overhead door system, or assembly, the counter balance system does not include a rotating shaft. In examples of the counter balance system for an overhead door system, or assembly, the counter balance system does not include a drum system. In examples of the counter balance system for an overhead door system, or assembly, the counter balance system does not include a door drum. In examples of the counter balance system for an overhead door system, or assembly, the counter balance system does not include a drive drum. In examples of the counter balance system for an overhead door system, or assembly, the counter balance system does not include a combination of any of the above or does not include all of the above.

In examples of the counter balance system the gas spring may be dampened at an end of the stroke of the gas spring. In examples of the counter balance system the compression of a stroke of the gas spring may be adjustable. In examples of the counter balance system the adjustment to the compression of the stroke of the gas spring may be a passive system. In examples of the counter balance system the cable may comprise a tensioning mechanism. The tensioning mechanism may be a passive tensioning mechanism. The passive tensioning mechanism may have a compression spring. The passive tensioning mechanism may have an extension spring arranged in an inverse arrangement to the example having a compression spring. Additionally, or alternatively, the passive tensioning mechanism may have a linear actuator and/or a gas spring. In examples of the counter balance system the counter balance system may further comprise a linear actuator that actuates movement, or is configured to actuate movement, of the overhead door assembly. In examples of the counter balance system the counter balance system may further comprise a linear actuator to adjust the stroke of the gas spring. In examples of the counter balance system the counter balance system may further comprise a snubber assembly that dampens or stops, or is configured to dampen or stop, the travel of the overhead door of the overhead door assembly.

In examples of the counter balance system for an overhead door system, or assembly, one or more of the gas springs comprise a spring ratio of between 1.0 and 2.0. In other examples of the counter balance system for an overhead door system, or assembly, one or more of the gas springs comprise a spring ratio of between 1.0 and 3.0. In examples of the counter balance system for an overhead door system, or assembly, the counter balance system provides a kinematic ratio of at least 1 to 1 and up to 6 to 1. Alternatively, this may be referred to as a mechanical advantage of 1 to 0.167.

In some examples of the counter balance system for an overhead door system, or assembly, the counter balance system may further comprise a second gas spring. A first end of the second gas spring may be fixed to, or is configured to be fixed to, the overhead door system, or assembly, and the second end of the second gas spring moves relative to, or is configured to move relative to, the overhead door system, or assembly. At least a first sheave may be secured to, or be adjacent to, the first end of the second gas spring as a directional sheave and at least a second sheave may be secured to the second end of the second gas spring as an amplifying sheave. The cable may additionally advance about the first and second sheaves of the second gas spring and the second gas spring provides, or is configured to provide, an additional counter balance, or counter balance force, to the overhead door system, or assembly. In some examples the first end of the first gas spring may be oriented opposite the first end of the second gas spring. A piston of the first gas spring may move from a housing of the first gas spring in the opposite direction as a piston of the second gas spring moves from a housing of the second gas spring. In some examples the first end of the first gas spring may be oriented in the same direction as the first end of the second gas spring. A piston of the first gas spring may move from a housing of the first gas spring in the same direction as a piston of the second gas spring moves from a housing of the second gas spring. In some examples, the first gas spring and the second gas spring may operate in series. In some examples, the first gas spring may operate during a first stage and an intermediate stage, only, and the second gas spring may operate during the intermediate stage and a third stage, only. In some examples, the first and/or the second gas spring may be secured to and between opposing overhead door rails. In some examples, the counter balance system for an overhead door system, or assembly, may be supported independent of an overhead door framed opening.

In an example of a counter balance system for an overhead door system, or assembly, the counter balance system may comprise a linear actuator. A first end of the linear actuator may be fixed to, or is configured to be fixed to, an overhead door system, or assembly. A second end of the linear actuator may move, or be configured to move, relative to the overhead door system, or assembly. At least a first sheave may be secured to, or adjacent to, the first end of the linear actuator and at least a second sheave is secured to the second end of the linear actuator. A cable may be operably connected to, or be configured to be operably connected to, an overhead door of the overhead door system, or assembly, and the linear actuator through a direct drive system.

In one example, a segmented door for a box truck comprises a counter balance system. The counter balance system comprises a gas spring where a first end of the gas spring is fixed to, or be configured to be fixed to, an overhead door system and the second end moves relative to the overhead door system. At least a first sheave is secured to, or is adjacent to, or is configured to be secured to, or configured to be adjacent to, the first end of the gas spring as a directional sheave and at least a second sheave is secured to the second end of the gas spring as an amplifying sheave. A cable is secured to, or is configured to be secured to, an overhead door through a cable arrangement. In the cable arrangement the cable may be operably connected directly to a compound pulley system and the first and second sheaves of the gas spring to provide, or configured to provide, a counter balance, or counter balance force, to the overhead door system. In some examples, the counter balance system of the segmented door may further comprise a second gas spring where a first end of the second gas spring is fixed to, or is configured to be fixed to, an overhead door system and a second end of the second gas spring moves relative to, or is configured to move relative to, the overhead door system. At least a first sheave may be secured to, or is adjacent to, the first end of the second gas spring as a directional sheave and at least a second sheave may be secured to the second end of the second gas spring as an amplifying sheave. The cable may additionally advance about the first and second sheaves of the second gas spring and the second gas spring additionally provides, or is configured to provide, a counter balance, or counter balance force, to the overhead door assembly. The first gas spring and the second gas spring of the counter balance system of the segmented door may operate in series where a first end of the first gas spring is oriented opposite the first end of the second gas spring. Further, the first gas spring may operate during a first stage and an intermediate stage, only, and the second gas spring may operate during the intermediate stage, and a third stage, only.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

The present disclosure is directed to overhead doors and systems for overhead door operation. More specifically, the present disclosure relates to a direct drive counter balancing system for operating overhead doors. In some examples, the direct drive counter balancing system of the present disclosure is for overhead door systems used in segmented door arrangements for box trucks. As used herein, counter balancing system is used interchangeably with counter balance system, counterbalancing system, and counterbalance system.

Figure 1:
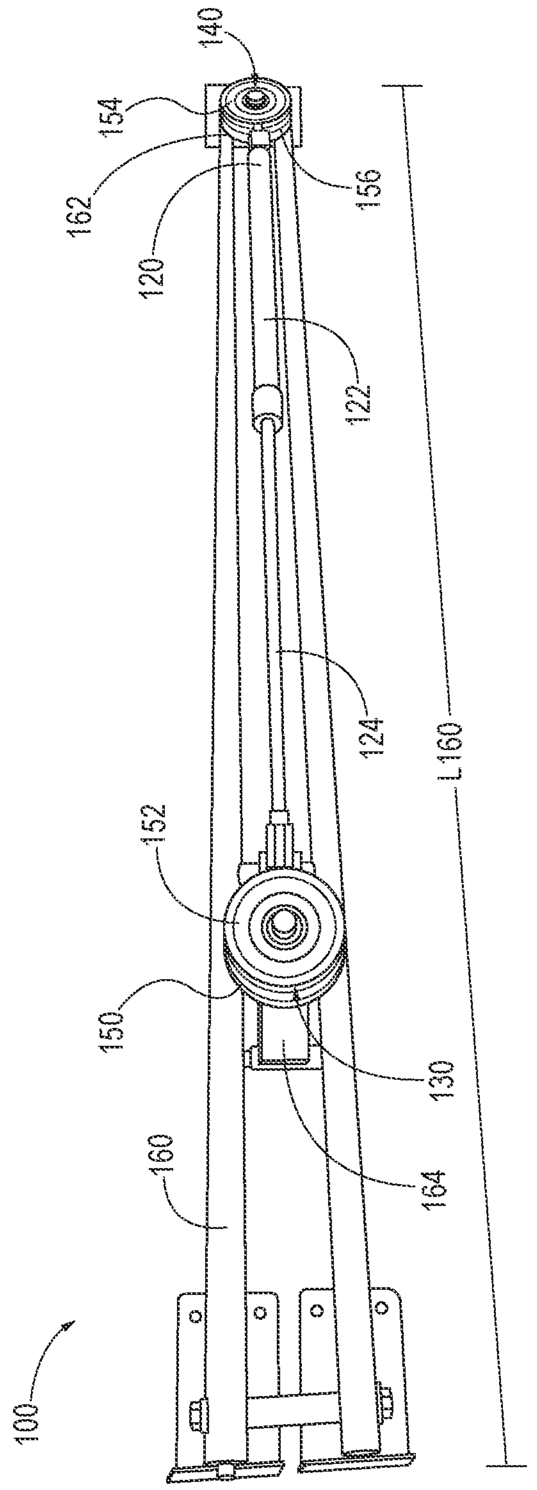
FIG. 1 is a perspective view of a single gas spring direct drive counter balance system, in accordance with an example of the disclosure.

In FIG. 1, a counter balance system 100 comprising a gas spring 120 is illustrated. Generally, a gas spring 120 comprises a housing 122 having compressed, or pressurized, gas. The compressed, or pressurized gas, operates a piston and rod 124, where the rod extends from one end of the housing 122. This piston and rod 124 may move between a fully extended position and a fully compressed position. The piston and rod may, alternatively, move between a partially extended position and/or a partially compression position, as further discussed in an example below. When moving from the extended position to the compressed position the gas within the gas spring pressurizes to store energy. In contrast, when moving from a compressed position to an extended position the gas within the gas spring depressurizes and releases energy. This energy provides the requisite resistive forces relied in operation of the present counter balance system 100.

Still referring to FIG. 1, the counter balance system 100 comprises one or more sheaves at each end of the gas spring 120. In this particular example, a pair of side-by-side sheaves 150, 152 are provided at the exposed end of the rod 124 at a first end 130. A second pair of side-by-side sheaves 154, 156 are provided at the opposite end of the gas spring 120 arrangement at a second end 140. In one example, sheaves of the side-by-side sheaves 150, 152 and/or 154, 156 may be secured together, such as being tethered together, bolted together, or the like, so that they rotate at the same rate. By securing the side-by-side sheaves together the cable travel on each respective sheave is maintained at a consistent rate between the side-by-side sheaves, when the sheaves are of the same dimension. Additionally, or alternatively, the sheaves may be a sheave having a double groove (or multiple grooves), may be a pair of sheaves on a single bearing, and/or a combination thereof, or the like. This provides for a more consistent door travel and results in reducing, or eliminating, any racking of the door between opposing lateral sides of the door that may otherwise be present or require compensation by other means. Racking, as used herein, is the sequential tipping of the moving door from left or right while raising or lowering. It may result from a variety of sources including, for example, a single cable lift or uneven cable tension between the left and right side cables, uneven friction between the track on the left and right side, or the like. The result of racking is a disruption of the smooth operation of the door and possible damage to the system, such as cable stretching or failure due to excess stresses.

Figure 1A:
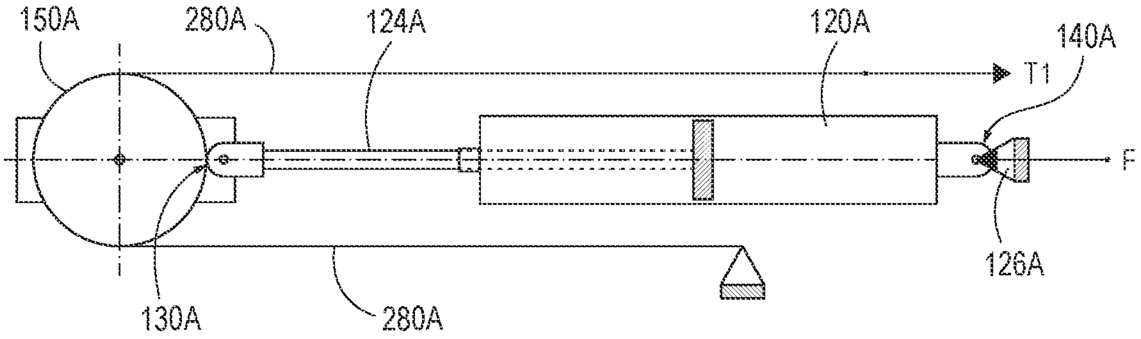
FIG. 1A is an example of the operation of a single gas spring direct drive counter balance system, in accordance with an example of the disclosure.

The sheaves 154, 156 of the second end 140 may be secured directly to gas spring 120 or secured to an adjacent supporting structure oriented adjacent to the gas spring 120. As illustrated by FIG. 1, the gas spring 120 may be secured within a framed structure 160 where the second end 140 of the gas spring 120 is additionally, or alternatively, secured, to the framed structure 160 and the first end 130 of the gas spring 120 moves along a length $L_{160}$ of the framed structure 160. Regardless of whether the sheaves 154, 156 of the second end 140 are secured directly to the gas spring 120 or secured to an adjacent supporting structure, the sheaves of the second end 154, 156 are fixed at an anchor 162. An anchor 162 is a point, fixed in space that experiences no displacement and serves as a support point for reacting forces while allowing the sheaves to rotate freely, unless that anchor is provided on a moveable, adjustable, carriage required for adjustment as further discussed in examples below. The fixed sheaves 154, 156 may simply be referred to as directional sheaves as they do not do any work but simply change the direction of the force applied to the cable while maintaining an assembly in equilibrium. In contrast, the sheaves 150, 152 at the second end move with the first end 130 and are amplifying sheaves. Amplifying sheaves do work by not only changing the direction of the force but also by imparting displacement as driven by the gas spring. A carriage 164 may be secured to the first end 130 and/or the rod 124 to maintain alignment with the framed structure 160 or the gas spring 120. The carriage may translate at least a partial length of the framed structure 160. FIG. 1A illustrates the operational characteristics of the counter balance system 100 of FIG. 1 in greater detail. Specifically, a gas spring 120A having a first end 130A and a second end 140A is fixed in place. Here, the second end 140A of the gas spring 120A is fixed at an anchor 126A. One or more sheaves, such as the directional sheaves 154, 156, as described in FIG. 1, may be fixed at the anchor 126A or fixed at another anchor location. At the first end 130A of the gas spring 120A, an amplifying sheave 150A is secured to the rod 124A of the gas spring 120A. The amplifying sheave 150A may be the amplifying sheaves 150, 152 as illustrated by FIG. 1. A cable 280A, such as the cable 280 illustrated and described in greater detail with respect to FIG. 2, below, extends about the amplifying sheave 150A. The gas spring 120A, the amplifying sheave 150A, and the cable 280A convert an output force of the gas spring 120A into a cable tension by virtue of the direction reversing character of the amplifying sheave 150A. Because the output of the gas spring is held in equilibrium by the cable force on each side of the amplifying sheave 150A, the output tension of this system is half the output tension of the gas spring alone. This is said to produce a mechanical advantage of 0.5 or a kinematic ratio of 2. As described herein, the kinematic ratio and mechanical advantage is the distance of cable travel as it corresponds to the distance of stroke the gas spring, or combination of gas springs, provide as understood by one of ordinary skill in the art. Mechanical advantage and kinematic ratio are described in greater detail below.

Figure 1B:
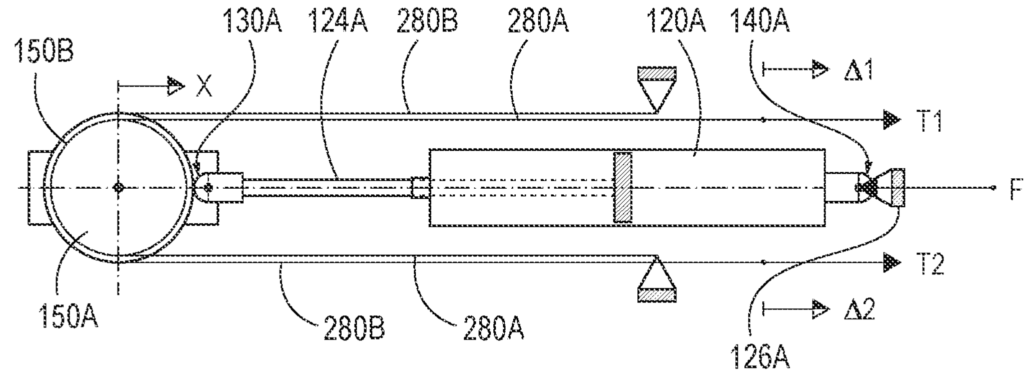
FIG. 1B is an example of the operation of a single gas spring direct drive counter balance system, in accordance with an example of the disclosure.

FIG. 1B illustrates the operational characteristics of the counter balance system 100 of FIG. 1, and as described in FIG. 1A, but further provides a pair of side-by-side sheaves and two cables. The two cables travel on a respective sheave of the side-by-side sheave to produce an output T1 at a first cable 280A and an output T2 at a second cable 280B with a single input F by a single gas spring 120A. The kinematic ratio and mechanical advantage are achieved in duplicate at cables 280A, 280B by a single gas spring which operate about amplifying sheaves 150A, 150B, respectively, on gas spring 120A, as described with respect to FIG. 1A. Such an arrangement may be relied on to attach each respective cable to opposing lateral sides of an overhead door. In this arrangement, the cables 280A, 280B are wound in opposite directions—thus, the amplifying sheaves 150A, 150B must also move in opposite directions and are not secured together while deploying the cables 280A, 280B. In another example, the cables may be wound in the same direction with the anchors, and may be placed on the same side relative to one another or relative to the door—thus, the cables would be displaced and travel in the same direction about the pair of amplifying sheaves. In this example, the sheaves may be secured together, may be a single sheave having a double groove (or multiple grooves), may be a pair of sheaves on a single bearing, and/or a combination thereof, or the like. Because the system is activated by a stroke X of a single gas spring, the respective kinematic ratio and respective mechanical advantage of the two cable systems are the same, and are created by the resulting displacement 41 of the first cable 280A and the resulting displacement 42 of the second cable 280B of the two separate cables 280A, 280B. Otherwise, a system where each respective cable is operated by independent gas springs may produce a resulting displacement 41 of the first cable 280A and a resulting displacement 42 of the second cable 280B which may not be equal. The reason a two cable system operation may be employed is so that each respective cable 280A, 280B may be secured to opposing lateral sides of an overhead door in order to operate both sides of the overhead door in unison to avoid racking. Additionally, or alternatively, the benefit of a two cable system operation also provides that when a single cable of a two cable system fails, or breaks, the door will remain operational under the remaining, or other, cable.

Figure 2:
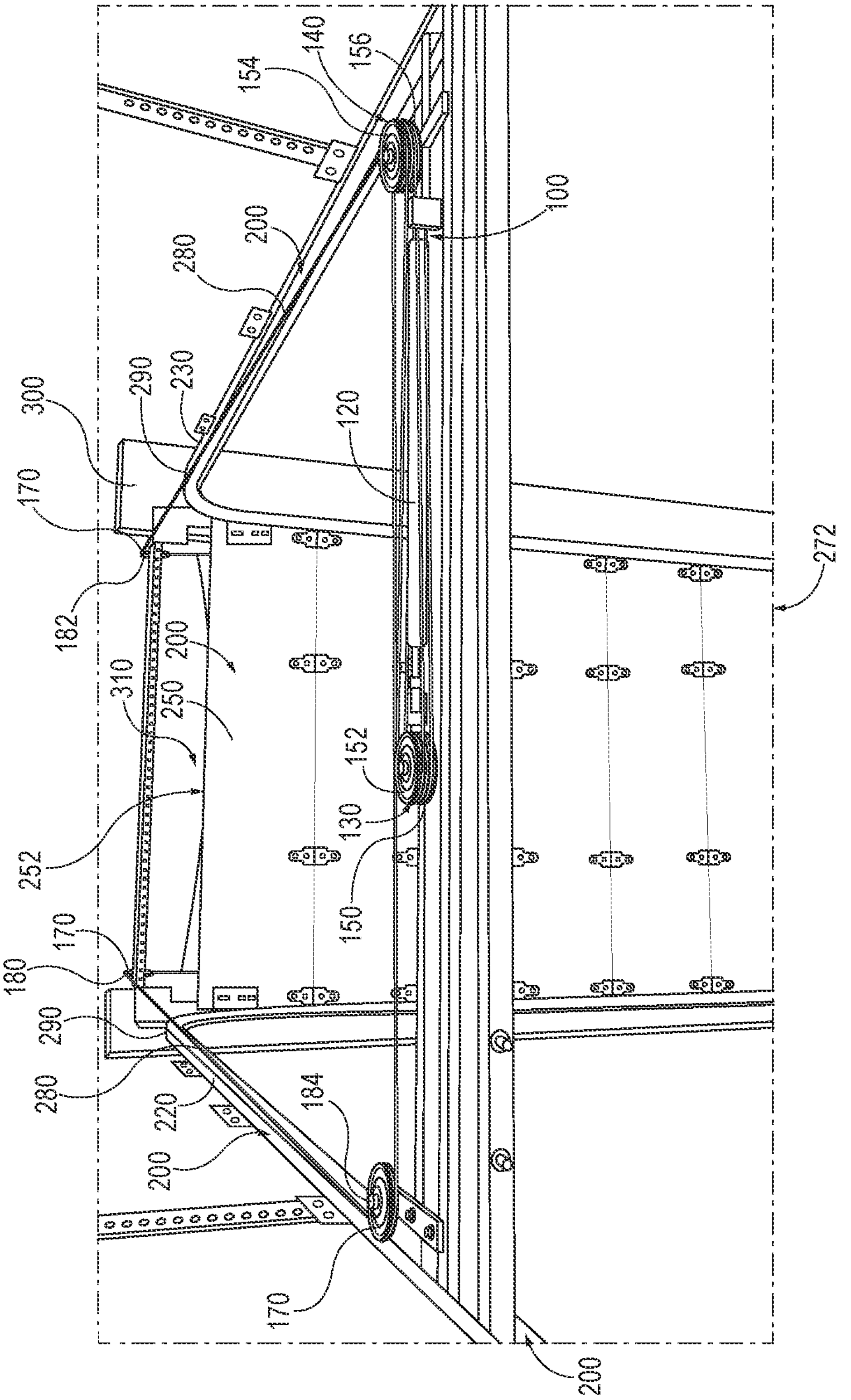
FIG. 2 is a perspective view of a single gas spring direct drive counter balance system in an overhead door assembly, in accordance with an example of the disclosure.

Turning to FIG. 2, the counter balance system 100 of FIG. 1 is further applied to an overhead door assembly 200. The counter balance system 100 of FIG. 1 may be mounted on the overhead door assembly 200 such as along a track 220 or between the tracks 220 and 230 and/or may be mounted to a framed structure 300 through which the overhead door opening 310 is provided. In the example of FIG. 2, the counter balance system 100 of FIG. 1 is mounted between the tracks 220 and 230 of the overhead door assembly 200 at the top end 252. In some examples, the counter balance system may be mounted along a wall and/or a ceiling. In some examples, the counter balance system may be mounted at any position along the track in any orientation relative to the track such as, for example, in line with a track on a horizontal section, in line with a track on a vertical section, spanning between the tracks at an intermediate section, and/or even independent of the track, such as being secured to the structure the track is, itself, secured to. In the example of FIG. 2, the framed structure of the counter balance system 100 is secured to each of the tracks 220 and 230 of the overhead door assembly 200. The gas spring 120 of the counter balance system 100 is supported between the tracks 220, 230. A compound pulley system 170, comprising a combination of directional sheaves 180, 182, 184 is further provided between the sheaves of the gas spring and the overhead door 250. The sheaves 180, 182 may be oriented in a manner such that they guide a cable in a similar pathway as the one or more of the tracks 220, 230 of the overhead door assembly 200. In one example, the compound pulley system may be a block and tackle arrangement and, thereby, may additionally be modified as amplifying sheaves. Thereby, the compound pulley system between the gas spring and the overhead door may provide further kinematic ratio and mechanical advantage to the operation of the overhead door. Further, one or more sheaves of the compound pulley system may comprise cable retainers. Cable retainers may be provided to keep cables from dislodging from the sheave in case of a failure. Cable retainers are shrouds or fenders positioned over the sheaves to prevent the cable from disengaging from the sheave groove.

Still referring to FIG. 2, a cable 280 is secured to the overhead door 250, such as to the base 272 of the overhead door. It is appreciated herein that the cable 280 may be secured to the door at any panel or any position on the door in order to perform the operation as relied on herein. In FIG. 2, the cable 280 generally follows the pathway of one or more of the tracks 220, 230. For additional stability and in one example, a cable 280, or separate cables, may generally follow the pathway of both tracks 220, 230. In FIG. 2 the cable 280 advances from the base 272 of the overhead door through a first sheave 180 that is a directional sheave positioned at a transition curve 290 of the overhead door assembly 200, where the transition curve 290 is positioned to the top of the overhead door opening 310. The first sheave 180 of the compound pulley system 170 is provided to transition the cable from traveling in a vertical direction to a generally lateral direction (or direction different than the vertical direction) and/or to continue following the respective track 220, 230 to the position of the counter balance system 100. Upon reaching the counter balance system 100, the second sheave 184 of the compound pulley system 170 is provided to align the cable 280 with the gas spring 120 of the counter balance system 100. It is contemplated herein in yet additional arrangements, the compound pulley system may include additional sheaves depending upon the position and orientation of the gas spring of the counter balance system. Moreover, a second cable, such as the second cable as described with respect to FIGS. 3C and 3E, below, may also be provided at the opposing base of the overhead door along the second track 230, in the same manner as the first track 220, and in order to balance the force being applied to the overhead door as further described below.

In some arrangements the second end of the cable, opposite the first end of the cable secured to the base of the door, may be secured directly to a gas spring. The second end of the cable may be secured to any component of the gas spring system. Alternatively, the second end of the cable may be secured directly to the overhead door such as, for example, the track. Stated more generally, in one example, the second end of the cable is secured to a fixed point which does not move, relative to the adjoining structure. The fixed point may be any point on the overhead door arrangement, including the gas spring, the adjoining structure, a framed structure, a track, or the like. In another example, the second end of the cable may be secured to a moveable point that travels with the gas spring extension. The various mechanisms for securing the second end of the cable may depend upon the counter balance system arrangement, the track arrangement, and/or the number of gas springs being utilized. In one specific example, a double crown track may be provided with the various arrangements described herein. A double crown track has a rounded profile at the top and bottom, rather than the combination of a rounded and flat profile at the top or bottom, respectively. A double crown track provide a symmetric pattern for improved centering of the garage door rollers, or carriage rollers, when the system reverses directions.

In some examples, a motor may be provided at one or more of the sheaves. The motor may be integral to or extend from the one or more sheaves. The motor is relied on to provide sufficient, or enough, friction on the cable to drive the cable about the sheave to actuate the door with the ideal amount of slip to prevent injury. The motor may drive the cable 90 degrees about the sheave (e.g. +/−90 degrees, more or less) to provide sufficient, or enough, force on the cable to actuate the door. In other examples, the motor may drive the cable about the sheave 45 degrees, 60 degrees, 75 degrees, 120 degrees, 180 degrees, or any variation thereof, depending upon the arrangement of the cable upon the sheave and the distance required to actuate the door. In some examples, a motor may be provided at multiple sheaves or a single motor may be relied on to drive multiple sheaves. In specific examples, one or more of the sheaves positioned at the door header may be driven by one or more sheaves as noted here. Any sheaves of the compound pulley system may be outfitted with a motor as noted herein. The sheaves may drive the cable and/or drive the sheaves about their rotational axis.

As described above, a dual cable system (FIG. 1B) or a single cable system (FIG. 1A) may be provided. In a dual cable system, a first cable may be secured to the base of the door to one side of a door while a second cable may be secured to the base of the door on the opposing side of the door, relative to the door opening width. Each of the first cable and the second cable may operate independently with the one or more gas springs. The first and second cables of the dual cable system may operate on, or through, the same gas spring system or on, or through, independent gas spring systems. The first cable and the second cable may each, independently, comprise a second end that is either secured to either a fixed point or to a moveable point, as noted in the preceding paragraphs. In such an arrangement, if one of the two cables were to fail, the remaining cable would still provide partial operation to the overhead door which remains operational relative to at least one side of the door. Accordingly, such a dual cable system would avoid catastrophic failure otherwise experienced by the failure of the spring in certain torsion spring systems. Alternatively, in a single cable system, a single cable may be secured to the base of the door to one side of the door at a first end of the cable. A second end of the cable may travel through the one or more gas springs and counter balance system where the second end of the cable is secured to the base of the door, at an opposing side of the door, relative to the door opening width. In both a dual cable system and a single cable system, fleet angles are coordinated, controlled, and maintained to provide a system in equilibrium. As used herein, a fleet angle is defined as the lateral angle subtended by the exiting cable with a line perpendicular with the axis of the sheave or drum. Generally, a sheave has rims or flanges that guide the cable and accommodate a fleet angle of several degrees left or right of this perpendicular line. Drums, however, have minimal surface features to guide the cable into a prescribed pattern, such as close packed helix and, thereby, cannot tolerate excessive fleet angles. In these drum situations the cable tends to walk, or travel, across the surface of the drum in an uncontrolled manner and can promote entanglement and excessive cable wear.

Referring back to the cable pathway of FIG. 2, the cable 280 advances from the compound pulley system into an arrangement about the sheaves 150, 152, 154, 156 secured to the gas spring 120. As illustrated herein, the sheaves may be side-by-side sheaves in order to impart additional mechanical advantage on the system and/or to facilitate a dual cable system. The side-by-side sheaves are illustrated by the combination of sheaves 150 and 152 and the combination of sheaves 154 and 156. The various degrees of kinematic ratio and mechanical advantage will be discussed in greater detail below. In some examples, a single sheave may be attached to the gas spring where the side-by-side sheaves are presently illustrated. In yet other examples, a plurality of sheaves may be attached to the gas spring where the side-by-side sheaves are presently illustrated. Again, the amount of mechanical advantage may be controlled by the parameters and size of the gas spring, the number of gas springs, the position of the cable on the overhead door, the sheaves, the arrangement of sheaves at the gas spring, and/or the arrangement of the sheaves making up the compound pulley system. As noted above, in one example, sheaves of the side-by-side sheaves 150, 152 and/or 154, 156 may be secured together, such as being tethered together, bolted together, or the like, so that they rotate at the same rate. By securing the side-by-side sheaves together the cable travel on each respective sheave is maintained at a consistent rate between the side-by-side sheaves, when the sheaves are of the same dimension. It is appreciated herein that in some examples and for some particular uses the side-by-side pulleys may not be tethered together, allowing them to operate independently. Additionally, or alternatively, the sheaves may be a single sheave having a double groove (or multiple grooves), may be a pair of sheaves on a single bearing, and/or a combination thereof, or the like. This provides for a more consistent door travel and results in reducing, or eliminating, any racking of the door between opposing lateral sides of the door that may otherwise be present and that may otherwise require compensation by other means. Securing the side-by-side sheaves together may also be employed in the examples of FIGS. 3-4, discussed in greater detail below. Also, side-by-side sheaves may include more than two sheaves.

Still referring to the cable pathway of FIG. 2, the cable 280 advances from a first end, secured to the door 250, about one or more sheaves (e.g., 180 and 184) to where it ultimately aligns with the gas spring 120 of the counter balance system 100. The cable advances about one sheave 154 and then about another sheave 152. In a dual cable system, the second end of the cable would then be affixed or secured as noted in the previous paragraph. A second cable may also be provided to advance from an opposing side of the door, relative to the door opening width. The second cable may advance about other sheaves (e.g., 156, 150) on the gas spring 120 in a similar manner as the first cable did on sheaves 152, 154. Alternatively, in a single cable system the first cable may continue about the additional sheaves (e.g., 156, 150) and be secured to the door 250, opposite the side where the first end of the cable 280 is secured, relative to the door opening width. In yet other examples, as illustrated by FIGS. 3-4, multiple gas springs may be utilized in various arrangements.

As referred to herein, the cable, sheave, and gas spring arrangement, wherein the door is directly secured to the gas spring of the counter balance system through a pulley system and, more specifically, a compound pulley system, is referred to herein as a direct drive system. Examples of the direct drive system of the present disclosure do not include a rotating shaft. Examples of the direct drive system of the present disclosure do not include a torsion spring, or a helical spring. Examples of the direct drive system of the present disclosure do not include a drive drum system. Examples of the direct drive system of the present disclosure do not include a door drum(s). Examples of the direct drive system of the present disclosure do not include a drive drum. The direct drive system does not wind cables. The direct drive system does not spool cables. Examples of the direct drive system do not possess separate drive cable(s) and counter balance cable(s). Having removed each of these features individually, and/or in combination, and their operations eliminates the potential for failure and maintenance of each of these respective components, eliminates fatigue otherwise exhibited by helical springs, increases the operation life (e.g. increases cycle counts), and/or provides for an improved control of motion. Moreover, the direct drive system of the present disclosure may be provided to, at least, maintain partial operation even when failure does occur, such as in a dual cable system noted above. In a specific example, it has been found that standard torsion spring counter balance systems for overhead door assemblies are limited to a typical cycle range of 10,000 to 25,000 cycles over their operational life. An example of the present direct drive counter balance system has been tested at 200,000 cycles, without failure. This is a significant improvement (8×) over the typical cycle life of a standard overhead door torsion spring counter balance systems currently available.

Figure 3:
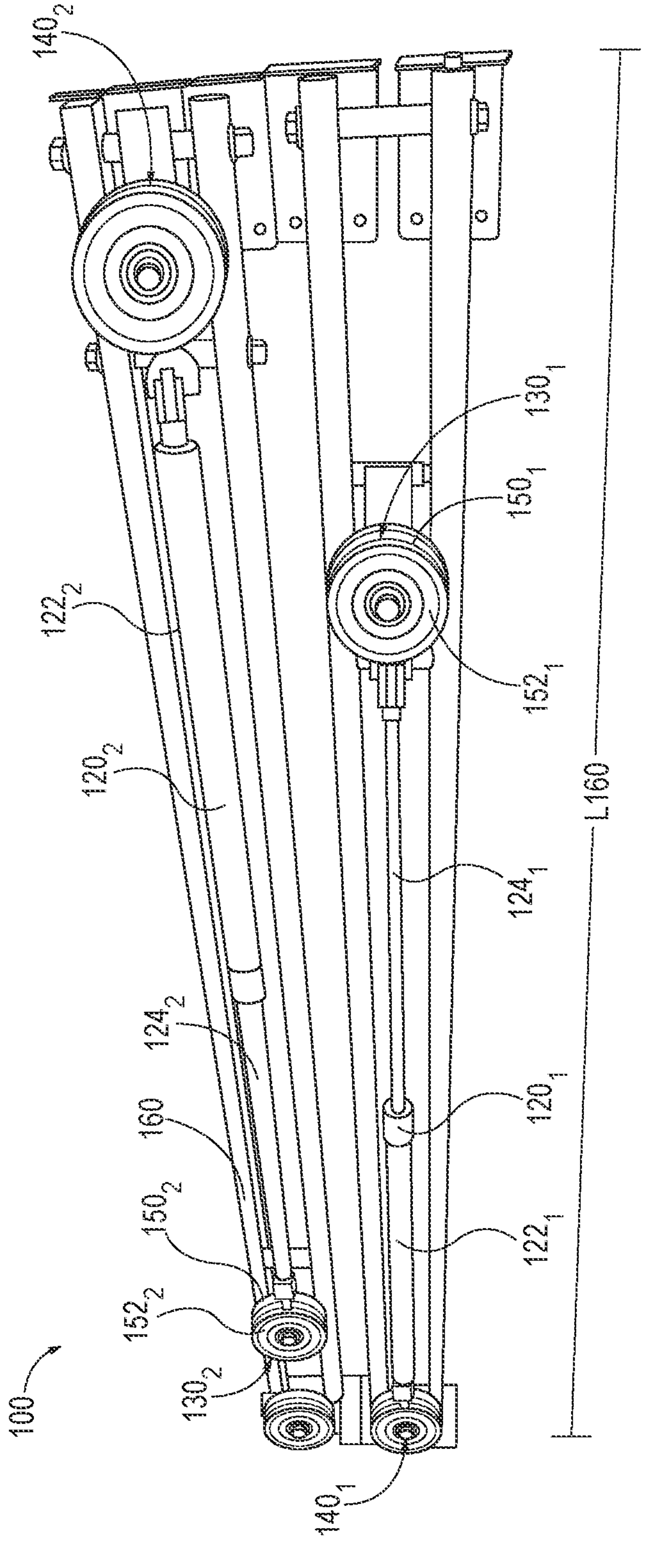
FIG. 3 is a perspective view of a multiple gas spring direct drive counter balance system, in accordance with an example of the disclosure.
Figure 4:
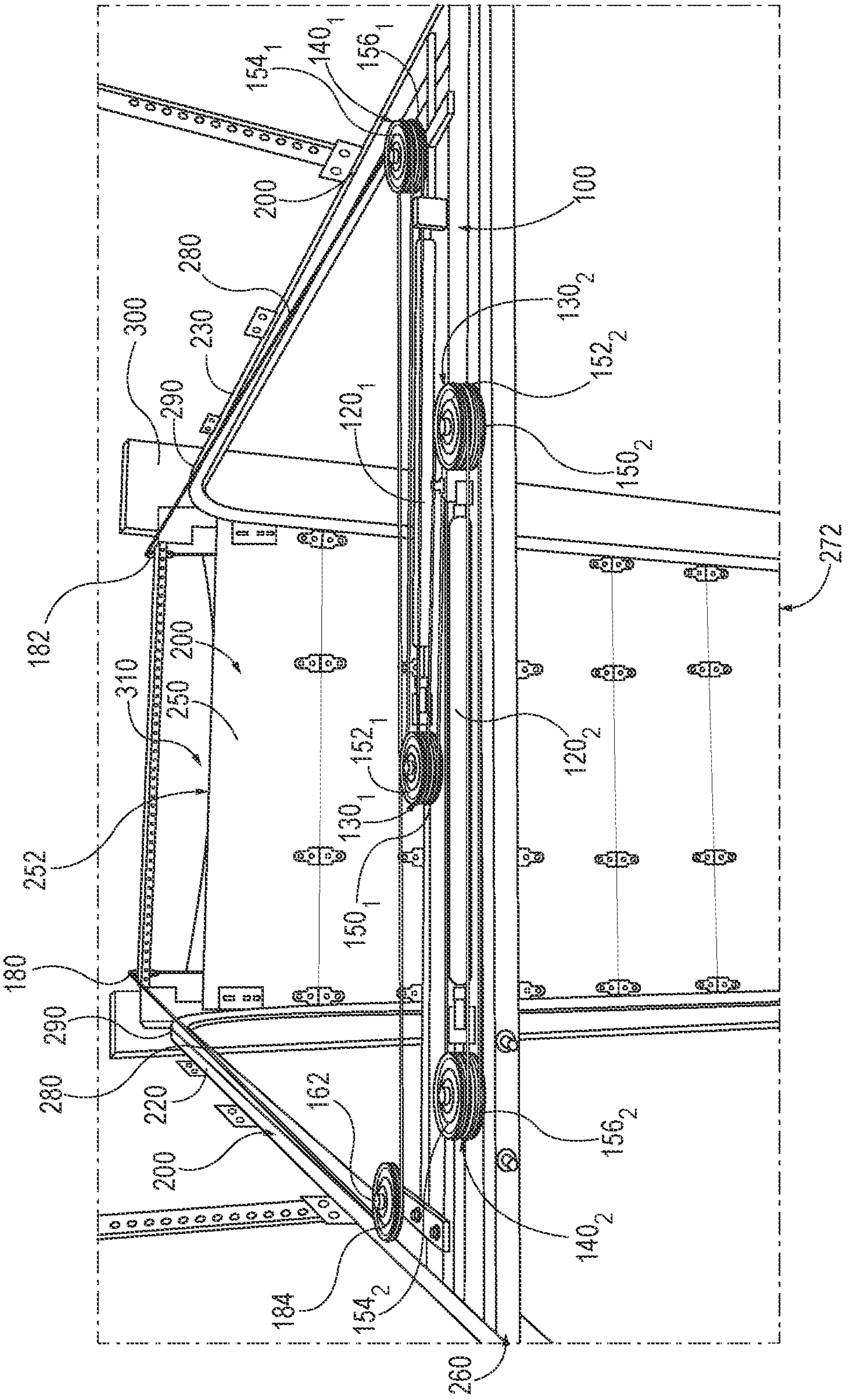
FIG. 4 is a perspective view of a multiple gas spring direct drive counter balance system in an overhead door assembly, in accordance with an example of the disclosure.

Turning now to FIG. 3, a counter balance system 100 comprising two gas springs $\mathbf{120}_1$, $\mathbf{120}_2$ is illustrated. The two gas spring counter balance system as described herein is additionally illustrative of a multiple gas spring counter balance system having more than two gas springs. In the counter balance system of FIG. 3, the two gas springs $\mathbf{120}_1$, $\mathbf{120}_2$ are arranged in an opposing orientation such that they do not operate in complete unison, or parallel operation, through their respective strokes. Instead, the two gas springs operate in series by supplementing one another at different stages of movement of the overhead door system. It is, however, appreciated that, in some examples, multiple gas springs may operate in complete unison, or parallel operation, on an overhead door arrangement. Additionally, or alternatively, it is also appreciated, as will be described in greater detail below, although the two gas springs may not operate in complete unison through their respective strokes they may operate in unison during one or more stages, or a partial stroke of each respective gas spring. Although the two gas springs of FIG. 3 are illustrated and described as being oriented in a parallel, yet opposing, relationship, the gas springs may be provided in any orientation or arrangement. By example, gas springs used in combination may be positioned at opposing sides of a door arrangement, may be perpendicular to one another, may be positioned on adjoining structures, may be oriented in the same direction, and/or additional variations thereof. These additional arrangements may be provided while still maintaining the operational characteristics identified herein by way of the direct drive arrangement between the cable, sheaves, and the gas springs.

Returning to FIG. 3, the two opposing gas springs $\mathbf{120}_1$, $\mathbf{120}_2$ are oriented such that each respective housing $\mathbf{122}_1$, $\mathbf{122}_2$ of the gas springs $\mathbf{120}_1$, $\mathbf{120}_2$ are arranged outwardly, relative to one another and/or the lateral sides of an overhead door assembly. In contrast, the pistons $\mathbf{124}_1$, $\mathbf{124}_2$ of the two opposing gas springs $\mathbf{120}_1$, $\mathbf{120}_2$ are arranged inwardly relative to one another and/or the lateral sides of the overhead door assembly, but operate in opposing manner. The cable (not shown) may be arranged through the compound pulley system and may be arranged about both the first gas spring $\mathbf{120}_1$ and the second gas spring $\mathbf{120}_2$. As noted above, each respective gas spring $\mathbf{120}_1$, $\mathbf{120}_2$ has sheaves $\mathbf{150}_1$, $\mathbf{150}_2$, $\mathbf{152}_1$, $\mathbf{152}_2$, $\mathbf{154}_1$, $\mathbf{154}_2$, $\mathbf{156}_1$, $\mathbf{156}_2$ attached thereto, where the gas spring arrangement of FIG. 3 is illustrated within an overhead door system, as illustrated by FIG. 4 below. Such sheaves have been described with respect to the single gas spring arrangement of FIGS. 1-2 and are applicable to the present example (e.g. singular sheaves, side-by-side sheaves, multiple sheaves, directional sheaves, amplifying sheaves, etc.) in order to achieve the desired kinematic ratio and mechanical advantage at its respective stage of movement of the overhead door system 200. The cable 280 may then further advance through a compound pulley system 170 and be secured to the door 250 as previously described by the numerous configurations noted above with respect to FIGS. 1-2. As noted above, FIG. 4 illustrates the counter balance system 100 of FIG. 3 positioned within an overhead door system 200 and with the gas springs compressed, similar to the relationship of the counter balance system 100 of FIGS. 1-2 and as described with respect to FIGS. 1-2.

With respect to operation, the first gas spring $\mathbf{120}_1$ of the two gas spring counter balance system 100 of FIGS. 3-4 operates, individually, as the counter balance to the overhead door system 200 upon initial movement, at a first stage of advancement of the overhead door 250. The first stage of advancement is, for example, initial movement of the overhead door system from a closed position. At a second stage in the advancement of the overhead door 250, or intermediate stage, the second gas spring $\mathbf{120}_2$ of the two gas spring counter balance system 100 of FIGS. 3-4 begins to operate and operates in combination with the first gas spring $\mathbf{120}_1$. The second stage of advancement of the overhead door 250 may include movement of the overhead door 250 in a position between the fully open and the fully closed positions. At a third stage of advancement of the overhead door 250, the first gas spring $\mathbf{120}_1$ reaches a limit of operation and ceases to provide assistance, and the second gas spring $\mathbf{120}_2$ continues to operate independent of the first gas spring $\mathbf{120}_1$. The third stage, for example, may occur as the overhead door 250 is approaching the fully open position from an intermediate position of the second stage. In summary, the first gas spring $\mathbf{120}_1$ and the second gas spring $\mathbf{120}_2$ operate in series with one another as a counter balance system 100 advances through the full operation of the overhead door system 200. If the force of the first gas spring $\mathbf{120}_1$ and the second gas spring $\mathbf{120}_2$ do not otherwise overlap in the second stage of advancement, the door 250 will exhibit a bump, or skip, where either the weight of the door 250 or the offsetting force of the counter balance system 100 are unbalanced. In another example, a plurality of gas springs may be utilized in series, having even more stages of advancement, in the manner described with respect to the two gas spring counter balance system of FIGS. 3-4. In yet another example, a pair of gas springs and/or multiple gas springs may be provided to operate in the same direction of operation and/or in unison. One example of this may be two gas springs operating a cable to each respective side of an overhead door independently. This may be further applied to the configuration of FIGS. 3-4, where the multiple gas springs may be utilized in parallel in combination with multiple gas springs being applied in series.

In a two, or multiple, gas spring arrangement, the first spring (relied on to offset the weight of the door from the floor to mid height) may be undampened in the extension motion. As referred to herein, undampened means not dampened. Dampened means to rely on stored energy to moderate the rate of loading and unloading resulting in a counter balance that will operate in a smooth controlled manner to avoid excessive velocities during opening and closing. For example, torsion springs are simple elastic members for storing energy but offer no opportunity for controlling their rate of response, i.e., the speed at which they can absorb or release energy. The elastic torsion spring additionally cannot dissipate unwanted kinetic energy which often is the cause for damage and energy. Alternatively, gas springs may use the compressibility of the gas to store energy, or may be dampened, which moderates the rate of loading and unloading resulting in a counter balance that will operate in a smooth controlled manner, avoiding excessive velocities during opening and closing. The second spring, or final spring (of a multiple spring arrangement), may have a reasonable amount of oil dampening to slow the door as it finishes its opening travel. In an example utilizing only two springs, the second spring offsets the weight of the door travel from the mid height portion to the fully open portion. In an example utilizing multiple springs, the final spring offsets the weight of the door travel from above the mid height portion to the fully open portion. The dampening, as referred to above, may only be in the extension direction of the gas spring and it only occurs at the end of the stroke. In this configuration, there is no dampening on the spring in the closing direction. To compensate for this the first gas spring, balancing the door from the floor, may be provided with oil dampening when it is being closed in addition to, or as an alternative to, that described in the preceding sentence. In other words, dampening may be controlled in any direction. The first spring, therefore, may have dampening to prevent the door from slamming to the floor when being closed.

Figure 3A:
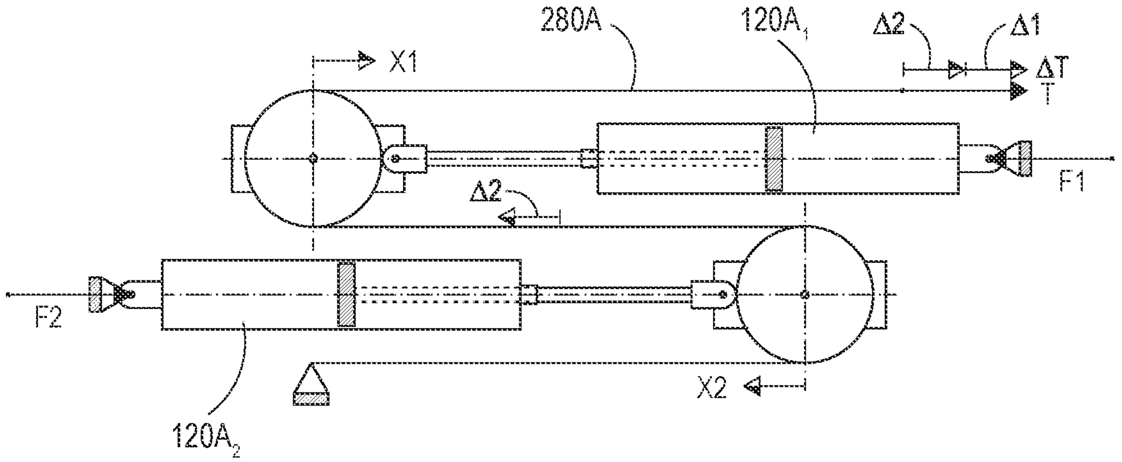
FIG. 3A is an example of the operation of a multiple gas spring direct drive counter balance system, in accordance with an example of the disclosure.
Figure 3B:
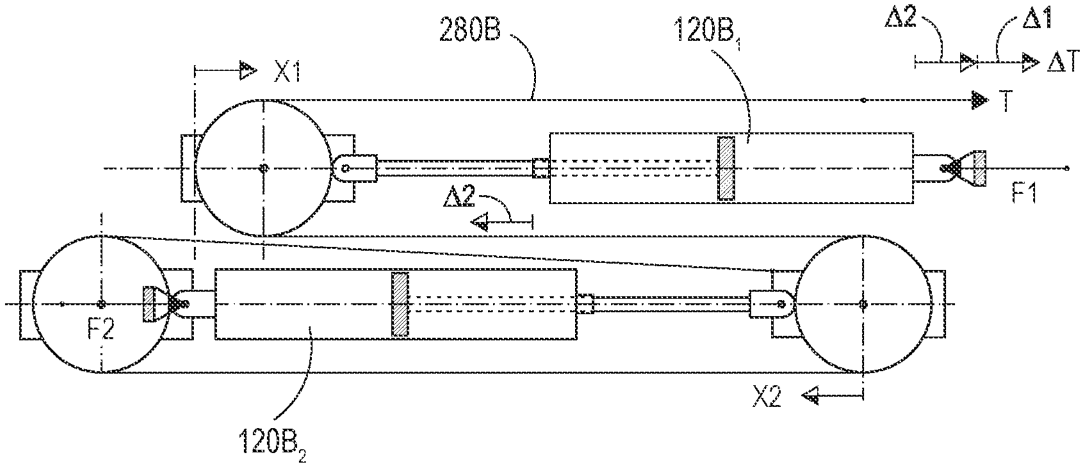
FIG. 3B is an example of the operation of a multiple gas spring direct drive counter balance system, in accordance with an example of the disclosure.
Figure 3C:
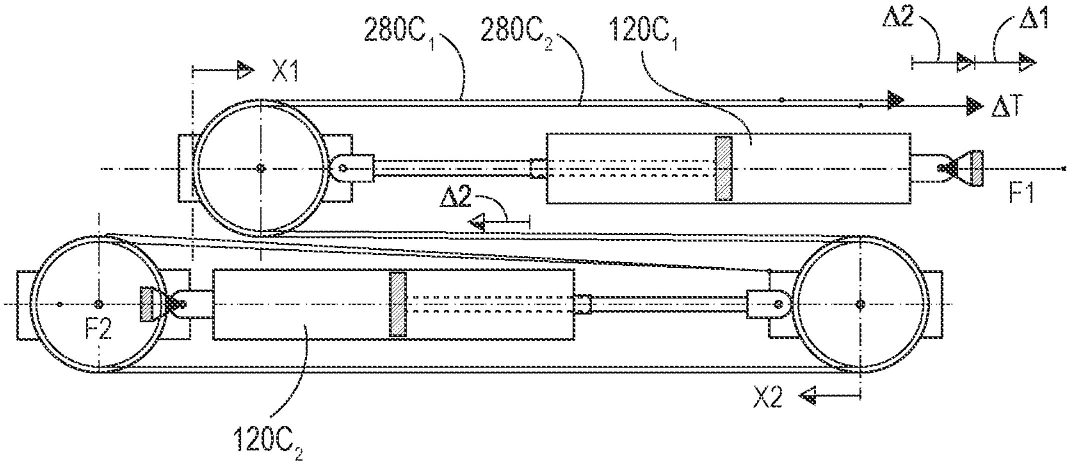
FIG. 3C is an example of the operation of a multiple gas spring direct drive counter balance system, in accordance with an example of the disclosure.

FIGS. 3A, 3B, and 3C illustrate variations to the example of FIGS. 3-4. These variations as described below vary the quantity of springs, quantity of cables, the operation of the gas springs (e.g., in series, in parallel, etc.), and the arrangement of the same. The impact of said variations are additionally discussed in greater detail below. In FIG. 3A, a two gas spring counter balance system is illustrated where two gas springs $\mathbf{120}A_1$, $\mathbf{120}A_2$ are provided with a single cable 280A. Each gas spring $\mathbf{120}A_1$, $\mathbf{120}A_2$ is activated by a respective stroke X1, X2 and may operate just as that described with respect to FIG. 1A but together in series. When the gas springs $\mathbf{120}A_1$, $\mathbf{120}A_2$ of the two gas spring counter balance system are assembled to operate in series the assembly produces an output total displacement $\Delta T$. The total displacement $\Delta T$ is the sum of the individual gas spring arrangement displacements $\Delta 1$, $\Delta 2$, while the force or cable tension T, remains uniform along the cable length. The two gas springs $\mathbf{120}A_1$, $\mathbf{120}A_2$ supply the respective input F1, F2 and a single cable 280A provides the output tension T force and displacement in the direct drive system described above.

In yet another arrangement of a direct drive counter balance system, FIG. 3B illustrates a two gas spring counter balance system where the two respective gas spring $\mathbf{120}B_1$, $\mathbf{120}B_2$ assemblies have different kinematic ratios and mechanical advantages in their respective designs. Accordingly, the different gas spring assemblies are paired to compensate for the varying kinematic ratios and mechanical advantages through the operation of each respective spring. This may be accomplished by varying the stages of operation. The result is a system with a single cable force, or cable tension T, from a respective input F1, F2 and a total displacement $\Delta T$ that adds the displacements of each respective gas spring arrangement $\Delta 1$, $\Delta 2$. In this example, the first gas spring $\mathbf{120}B_1$ may have a mechanical advantage of 0.5 and kinematic ratio of 2 while the second gas spring $\mathbf{120}B_2$ may have a mechanical advantage of 0.333 and kinematic ratio of 3. The resulting system produces a response that has three stages of operation. For example, the gas spring assembly having the lower activation force initiates motion first while the spring assembly, having the higher activation force, remains fixed. When the tension force exceeds the higher activation force, the gas spring assembly having a higher activation force initiates motion. Thereafter, when the tension of the cable 280B reaches the maximum stroke force of the gas spring assembly having the lower activation force the gas spring assembly having the lower activation force stops while the gas spring assembly having the high activation force continues. The cable finally stops when both gas springs reach their maximum strokes, Again, each gas spring 120$B_1$, 120$B_2$, as activated by the respective strokes X1, X2, may operate just as that described with respect to FIG. 1A but together in series as described above. As described herein, a smoothly operating two gas spring counter balance system, with no discontinuities in the tension force versus cable displacement, requires the two gas spring assemblies to operate in series with overlapping zones where the full stroke force of the lesser system exceeds the activation force of the superior system.

In yet another arrangement of a direct drive counter balance system, FIG. 3C illustrates a two gas spring 120$C_1$, 120$C_2$ counter balance system where two independent cables 280$C_1$, 280$C_2$ are provided. In this arrangement, the gas springs operate in in series, or stages but the two independent cables 280$C_1$, 280$C_2$ operate independent of one another over the gas springs to operate opposing sides of an overhead door. The example of FIG. 3C is an application of the principles as described with respect to FIG. 1B illustrating a single gas spring counter balance system but providing two (or more) gas spring assemblies as described with respect to FIG. 3A and/or FIG. 3B. The resulting end total displacements ΔT of the respective cables are equal and are a combination of the displacement of each respective gas spring arrangement Δ1, Δ2, relative to the respective gas spring input F1, F2 operating in series.

Figure 3D:
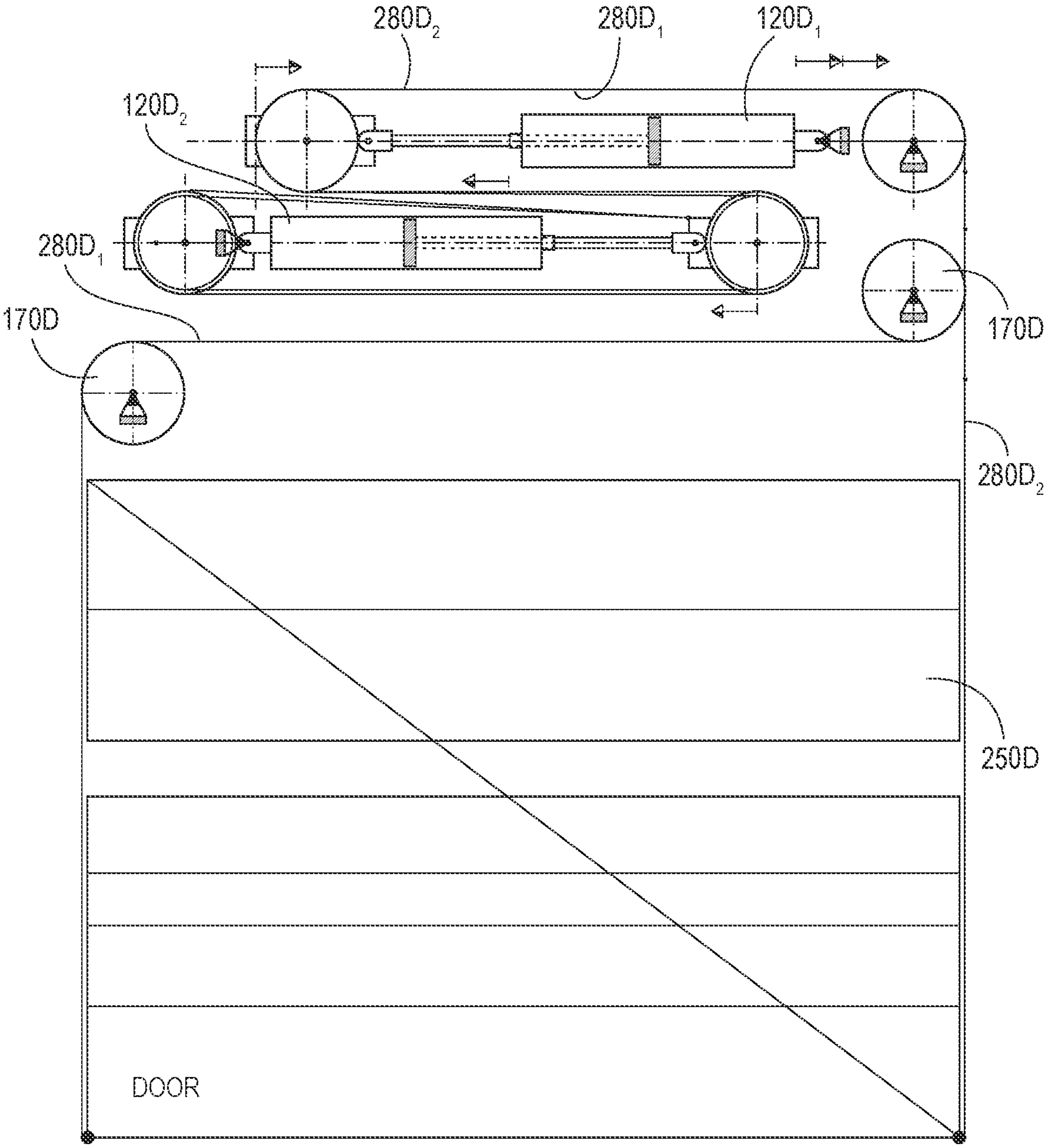
FIG. 3D is a two-dimensional representation of a multiple gas spring direct drive counter balance system, in accordance with an example of the disclosure.

FIG. 3D, is a two-dimensional representation of the two gas spring counter balance system of FIG. 3C further applied to an overhead door assembly to illustrate the two gas springs 120$D_1$, 120$D_2$ and of the direction of travel of the first cable 280$D_1$ and second cable 280$D_2$. Additionally illustrated, in the two-dimensional representation, are additional directional sheaves 170D which may be provided to complete the system for an overhead door assembly, to facilitate the travel of each respective cable to a respective lateral side of the overhead door 250D. The additional directional sheaves 170D of FIG. 3D are comparative to the directional sheaves 180, 182, and 184 of the compound pulley system 170 of FIG. 4.

Figure 3E:
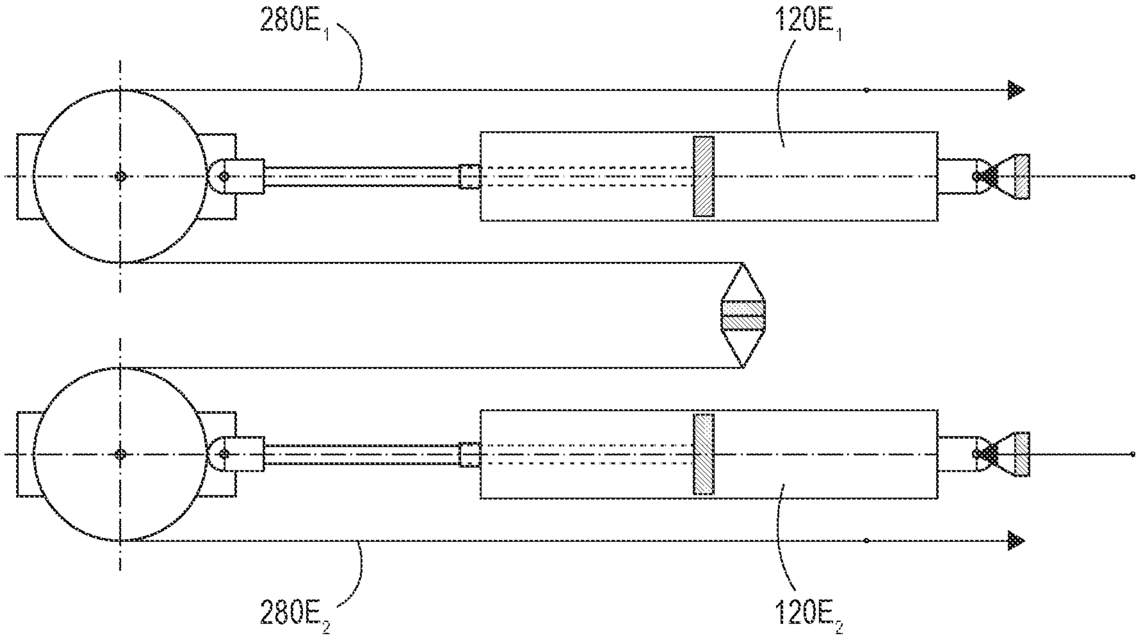
FIG. 3E is an example of the operation of a multiple gas spring direct drive counter balance system, in accordance with an example of the disclosure.

Cumulative, FIGS. 3A-3D illustrate several exemplary variations of a two gas spring counter balance system where the gas springs work in combination in the operation of an overhead door. These examples illustrate how a system may be a simple arrangement, a complex arrangement, and further customized or optimized for a particular use by way of the gas spring arrangement, the gas spring set-up, the cable arrangement, or the like. For example, a single cable or multiple cables operate about both gas springs of the two gas spring counter balance system as illustrated by FIGS. 3A-3D. In yet another example, a two gas spring counter balance system may be provided where the cables operate independently about each respective gas spring of the two gas spring counter balance system. Such an example is illustrated by FIG. 3E. As shown in FIG. 3E, two single gas spring counter balance systems operate in parallel to form a two gas spring counter balance system. The two single gas springs 120$E_1$, 120$E_2$ operate in parallel while acting independently. There are no restrictions on their forces or displacements. A first cable 280$E_1$ operates about a first gas spring 120$E_1$ and a second cable 280$E_2$ operates about a second gas spring 120$E_2$. A single cable may be relied on but anchored between each gas spring so each section of cable operates independently on each respective gas spring. Each of the springs 120$E_1$, 120$E_2$ generate their own force-displacement response curve, depending on their respective mechanical advantage and kinematic ratio.

Figure 5:
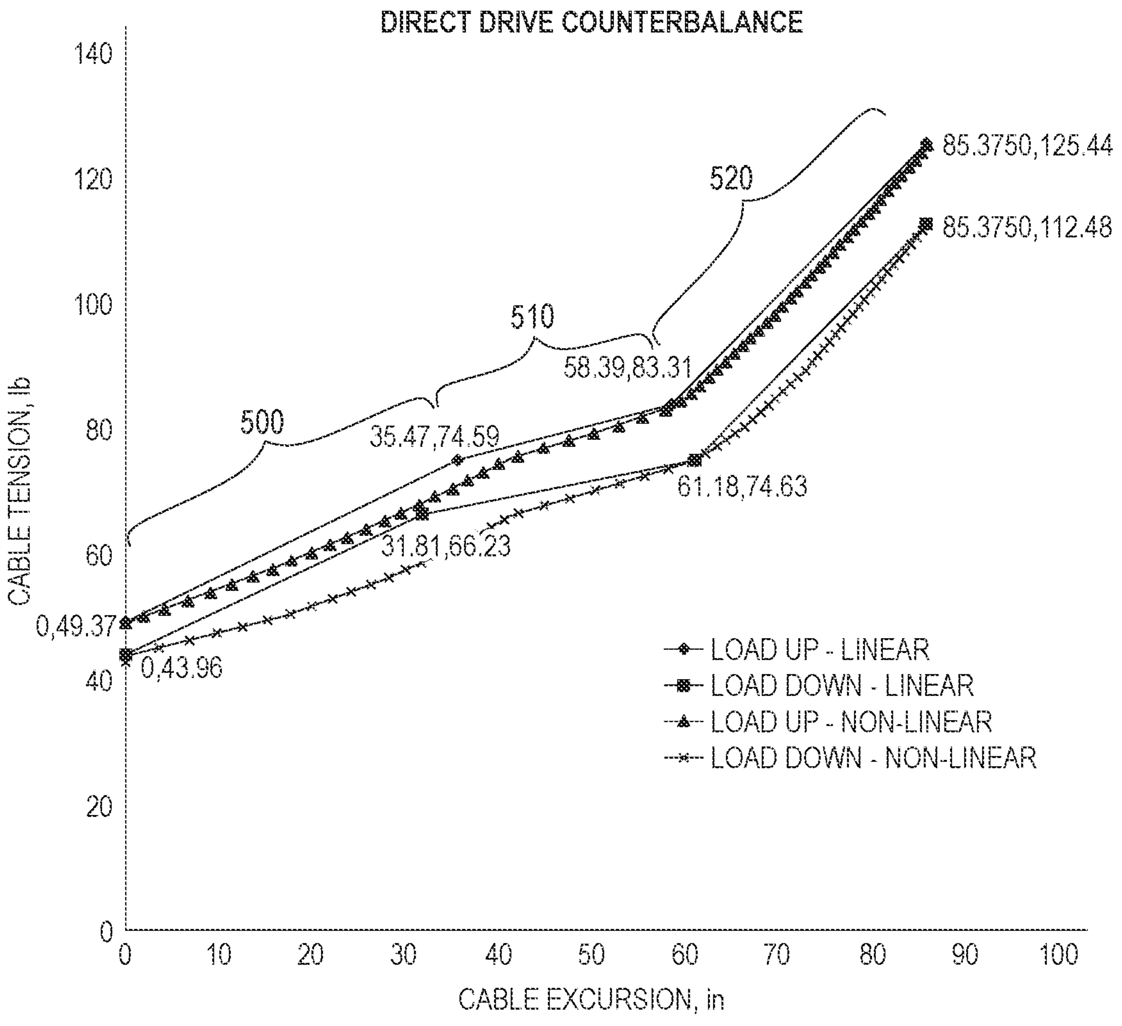
FIG. 5 is a graph illustrating the operation of multiple gas spring direct drive counter balance systems as described herein.

Turning now to FIG. 5, a chart is provided to illustrate the direct drive counter balance system operation described by FIGS. 3C and 3D. In the chart, cable tension, in pounds (lb.), is illustrated on the y-axis while the cable excursion, in inches (in.), is illustrated on the x-axis. The "Load up" and "load down" references in the charts are the measure of the response of the gas spring action. "Load up" is when a compression load is applied and energy is stored by the gas springs by virtue of an increase in the pressure on the gas within the gas spring. In the counter balance system for an overhead door, "load up" occurs as a garage door travels from an open position to a closed position, or as the gas spring action pressurizes. In contrast, "Load down" is when the applied load is relaxed and the piston rods of the gas spring return to their original length. In the counter balance system for an overhead door, "load down" occurs as a garage door travels from a closed position to an open position, or as the gas spring action depressurizes. The chart compares this loading and unloading of the gas springs and illustrates the area between the loading curves and the unloading curves is the energy lost in the process which is the source of damping.

The chart of FIG. 5 additionally illustrates the stages of operation for two gas springs operating in series. For example, when raising, or opening, an overhead door (e.g., load down), a first stage 500 is illustrative of when a gas spring assembly requiring a lower activation force operates alone. The second stage 510 is illustrative of when the gas spring assembly requiring the low activation force operates in combination with a gas spring assembly requiring a higher activation force. Finally, the third stage 520 is illustrative of when the gas spring assembly requiring the higher activation force operates alone, such as when the gas spring assembly having the lower activation force has already reached its maximum compression. The inverse occurs upon lowering an overhead door (e.g., load up). The graph illustrates the operation, load, and travel by way of the counter balance system as the overhead door is lowered (e.g., load up) and as the overhead door is raised, or opened (e.g., load down). A linear and a non-linear representation are both provided. The linear representation assists with illustrating the characteristic points, by way of the numerical values, that occur at the above-mentioned stages. These positions on the linear representations correspond to the same positions for the respective stages on the corresponding non-linear representations.

FIG. 5 illustrates, when used to counterbalance a door, the gas springs are maximally compressed when the door is closed (e.g., x=83.375) and extended when the door is open (e.g., x=0). The corresponding forces in the springs at these positions are bounded by the two force values of the curves. To serve as a counterbalance, the stored energy of the springs must be at the maximum when the door is closed and the gravitational potential energy of the mass of the door is at its lowest. When the door is open and elevated in the gravitational field, the potential energy of the door is at a maximum and the stored energy of the springs is at its minimum.

Figure 6:
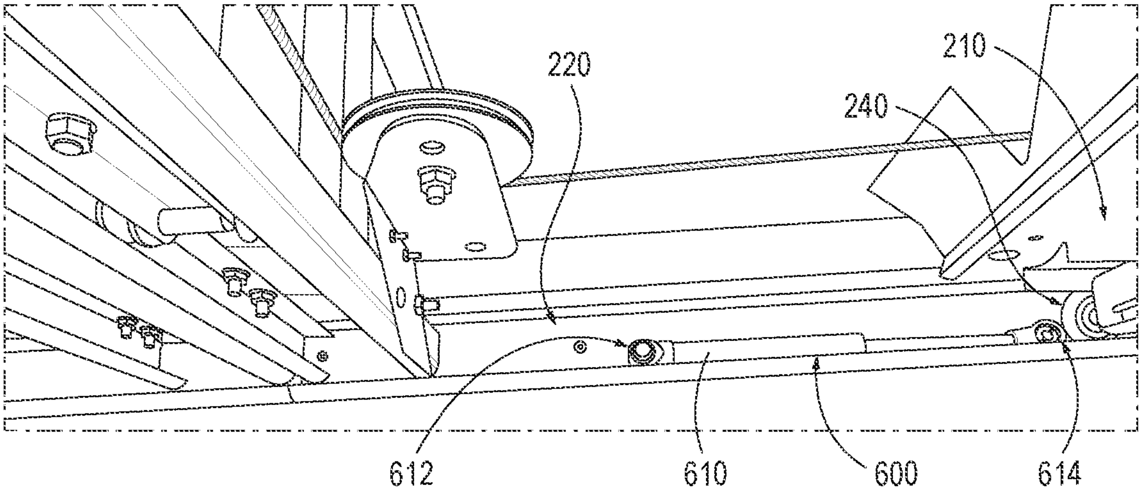
FIG. 6 is an example of a snubber arrangement in an overhead door assembly, in accordance with an example of the disclosure.

In FIG. 6, a snubber 610 is illustrated within a snubber arrangement 600 for an overhead door assembly. A snubber 610 is a device which is provided to additionally absorb the energy of an overhead door that is in motion and/or to further control the motion of the overhead door once the overhead door engages the snubber and snubber assembly. The snubber 610 may assist a counter balance system by absorbing the energy of a moving overhead door to bring said overhead door to a stopped position. In this example, the snubber 610 is positioned within a track 220 of an overhead door assembly. The snubber 610 and the snubber assembly 600 may be provided in any overhead door assembly and/or any counter balance system, including the overhead door assembly of the present disclosure and in combination with the counter balance system of the present disclosure. In this example, the snubber 610 is a gas spring secured on a first end 612 to the track 220. Additionally, or alternatively, the snubber 610 may be secured to any other adjoining structure and/or secured at additional locations. At the second end 614, the snubber 610 may have a receiving end such as, for example, a cushioned component, roller, or the like. In this example, the second end 614, or receiving end, mates with a top roller 240 of an overhead door 210 and is relied on to absorb energy from the moving door. It is contemplated herein the snubber may engage any other component of the overhead door 210. In this example, the snubber 610 remains stationary in the track 220 and provides a cushioned stop for the overhead door 210 when the overhead door 210 reaches full height (or in any direction the door may travel). In this example, the snubber 610 is secured to the track 220 but is independent of the overhead door 210 of the overhead door assembly. The snubber absorbs the energy of the overhead door for controlled motion of the overhead door once the overhead door engages the snubber and snubber assembly. The snubber may be a gas spring, other spring, a compression component, tension component, or the like, and/or any like component which produces dampening. In some examples the snubber is dampened on extension in its arrangement in the overhead door assembly. In some examples, the snubber is dampened on compression in the overhead door assembly. In some examples, the snubber is dampened in both direction in the overhead door assembly. In other examples, the snubber has no dampening at all.

The kinematic ratio and mechanical advantage of the counter balance system examples noted above may be achieved by way of the sheave arrangement, the gas spring arrangement, multiple cables, or a combination thereof. In one example, one or more gas springs having a spring ratio of 1.3 may be provided. In a two gas spring counter balance system, each of the gas springs may have a spring ratio of 1.3. Spring ratio is the compressed force, or pressure, divided by extended force, or pressure. In another example of each of the above variations, one or more gas springs having a spring ratio of 1.5 may be provided. In a two gas spring counter balance system, each of the gas springs may have a spring ratio of 1.5. In yet another example of each of the above variations, or a combination of the first example here, one or more gas springs having a spring ratio of 1.9 may be provided. In a two gas spring counter balance system each of the gas springs may have a spring ratio of 1.9. Generally, gas springs may be provided having a spring ratio in the range of 1.0 to 2.0 or 1.0 to 3.0, individually and/or in combination. Further, it may be by way of providing a two gas spring counter balance system in series, such as the example of FIGS. 3-4 an increased spring ratio may be achieved such as, for example, a combined spring ratio of 3. These various spring ratios assist with providing the requisite kinematic ratio and mechanical advantage required for the present counter balance systems. Specifically, in one example, the present counter balance system may provide a kinematic ratio of 4 to 1 (mechanical advantage of 0.25). In yet another example, the present counter balance system may provide a kinematic ratio of 6 to 1 (mechanical advantage of 0.167). In a general example, the present counter balance system may provide a kinematic ratio ranging from 1 to 1 up to 6 to 1 (mechanical advantage from 1 to 0.167). In still yet another example, each respective gas spring of a single counter balance may provide varying kinematic ratios and mechanical advantages based upon the overhead door arrangement and operable position to the door during operation. By example, a first spring may provide a kinematic ratio of 4 to 1 (mechanical advantage of 0.25) while a second spring may provide a kinematic ratio of 6 to 1 (mechanical advantage of 0.167) in the various examples as described above. In a general example, each respective gas spring may provide a kinematic ratio ranging from 1 to 1 up to 6 to 1 (mechanical advantage from 1 to 0.167). Each gas spring may have the same kinematic ratio and mechanical advantage, a different kinematic ratio and mechanical advantage, or a combination thereof, such as in an example where a plurality of gas springs may be provided. As noted above, the kinematic ratio and mechanical advantage is the distance of cable travel as it corresponds to the distance of stroke the gas spring, or combination of gas springs, provide.

A means for adjustment of compression in the first gas spring (relied to balance the door from the floor) may be provided that allows for the pre-compression of the stroke of a gas spring to be adjusted. This may be provided to compensate for any dramatic temperature fluctuations. Examples of such means include a worm driven cable, a worm driven sheave assembly, a combination thereof, or the like. The means for adjustment of compression forces the amount of needed cable in the system to either be more or less. This could be provided for both cables, left side and right side, simultaneously. It is contemplated herein that any such means for adjustment may be provided at any of the gas springs for adjustments of other kinds, as well. Alternatively, the means for adjustment of compression may be referred to as a compression adjustment mechanism.

A means of tensioning one of the two, or both, (left side vs right side) cables, together or independently, may be provided to make the tensions in both cables equal. Such a means prevents a cable from one side from carrying a majority of the tension thereby allowing the door to translate level, or even, through its travel. Examples of such means may include a ratcheting mechanism, a winding mechanism, a combination thereof, or the like. Alternatively, the means of tensioning may be referred to as a tensioning mechanism.

A number of other operating mechanisms or adjustment mechanisms are further contemplated herein and described below. The operating and/or adjustment mechanisms may be applied in combination with the counter balance system and/or overhead door assembly of the present disclosure. Additionally, or alternatively, the operating and/or adjustment mechanisms may be applied in combination with counter balance systems and/or overhead door assemblies otherwise known in the art.

The counter balance systems and/or overhead door assembly may comprise an electrical operation using a linear actuator. A linear actuator, or combination of linear actuators, may be relied on to operate the overhead door assembly. A linear actuator, or combination of linear actuators, may be relied on as an alternative to the gas spring arrangement of the counter balance system disclosed herein. The linear actuator may be provided in place of one or more of the above gas spring as a part of the above counter balance system such that a linear actuator 120, 120A, $\mathbf{120}_1$, $\mathbf{120}_2$, 120$\mathrm{A}_1$, 120$\mathrm{A}_2$, 120$\mathrm{B}_1$, 120$\mathrm{B}_2$, 120$\mathrm{C}_1$, 120$\mathrm{C}_2$, 120$\mathrm{D}_1$, 120$\mathrm{D}_2$, may be represented in FIGS. 1-2, 1A-1B, 3-4, and 3A-3D, respectively, in place of the gas springs described above. In other words, linear actuators may replace one or more of the above gas springs as a part of the above counter balance system. Alternatively, a linear actuator, or combination of linear actuators, may be relied on in combination with the gas spring arrangement of the counter balance system disclosed herein (or other counter balance system). The linear actuator may act as an energy storage device to actuate the door, as a counter balance device, or as a lifting device. For example, the linear actuator may be operably connected to an overhead door in combination with or independent of the above counter balance system. Moreover, the linear actuator, or combination of linear actuators, may be an adjustment mechanism relied on in combination with a counter balance system and, specifically, the counter balance system of the present disclosure. As used, herein, an energy storage device is relied on to refer to any device relied on to counteract the weight of an overhead door for efficient and balanced operation of the door and may include extension springs, compression springs, coil springs, gas springs, linear actuators, the like, and a combination thereof, as described herein.

In one example where a gas spring may be utilized in combination with a linear actuator, a gas spring of the counter balance system of the present disclosure may not rely on its full stroke to operate a door. Thereby, the gas spring of the counter balance system of the present disclosure may operate in combination with a linear actuator to adjust the stroke of the gas spring. The linear actuator may be secured to and/or move or adjust one or more of the sheaves and/or one or more of the gas springs to accomplish this. In other words, the gas spring of the counter balance system of the present disclosure need not be in a fully compressed arrangement while a door is positioned on the floor but, instead, be adjusted to start several inches within its stroke (e.g., 1", 1½", 2", or the like). The gas spring is thereby larger than required in its arrangement as a counter balance system for the overhead door and provides adjustment therein by, for example, a linear actuator as described herein. It is further contemplated that this adjustment is not limited to a linear actuator and may be accomplished by any other mechanical, electro-mechanical, or other means known in the art. Such an adjustment, where the gas spring of the counter balance system is oversized, may be relied on for adjustment in cable length and spring length. For example, as the cable length increases in the counter balance system, the spring length, or stroke, decreases, or vice versa when undergoing an adjustment as noted above. By relying on a linear actuator for such a system the system may be a passive system. Such a passive system may be operated or adjusted while the door is in operation as opposed to requiring adjustment while the door is out of service. Moreover, such an adjustment mechanism may operate while the door is in service, or operation, in order to continuously balance the door and/or tension the cable between the various springs or in independent cable operation of a multi-spring counter balance system. In these systems, a linear actuator may be positioned on a gas spring, may be positioned at a sheave arrangement, may be positioned between a sheave arrangement and a gas spring, may be positioned between sheave arrangements, or the like.

In one specific example for a single stage unit, a counter balance system of the present disclosure comprises an energy storage device that is limited to a linear actuator. In other words, the counter balance system relies on a linear actuator, alone, without a gas spring arrangement. In another specific example for a single stage unit, a counter balance system of the present disclosure comprises an energy storage device that is a combination of a linear actuator and another energy storage device (e.g., gas spring, extension spring, compression spring, coil spring, or the like). In this example, the linear actuator may be provided in parallel with the other energy storage device. More generally stated, an electric and/or hydraulic energy storage device may be combined with in parallel with a hydraulic, mechanical, and/or spring energy storage device.

In one specific example for a double stage (or multi-stage) unit, a counter balance system of the present disclosure comprises an energy storage device that is limited to one or more linear actuators. In other words, the double stage (or multi-stage) counter balance system of the present disclosure relies on one or more linear actuators, alone, without a gas spring arrangement. In another specific example for a double stage (or multi-stage) unit, a counter balance system of the present disclosure comprises an energy storage device that is a combination of one or more linear actuators and another energy storage device. It is further contemplated that the above examples are not exclusive of one another. For example, a double stage (or multi-stage) unit may rely on a combination of one stage operation by way of a linear actuator or gas spring, alone, while an alternative stage relies on a combination of energy storage devices.

A set of controls may be provided in combination with the variations identified above in view of a linear actuator. The controls may operate or adjust based upon any one or a combination of temperature, position, rotation, pressure, and/or force. The controls may be relied on to monitor the behavior and operation of the overhead door assembly and may further implement check-and-balances and/or other operational features in view of safety and performance. These controls may additionally, or alternatively, initiate adjustment between the various energy storage devices described above based upon cable tensioning, door balancing, door travel, or the like. These adjustments may occur passively as noted above.

Additional adjustment mechanisms may be provided to level an overhead door assembly. For example, a door may not be level when one cable in the overhead door assembly is longer or shorter in length than a corresponding cable in the assembly. To level the door, which is necessary to assure the door translates true within its track system, a first sheave (from one side of the door) may be moved, or adjusted, while holding, or maintaining, a second, opposing, sheave on the second side, or opposing side, of the door in a fixed position. The movement will force one side (one cable) to either lift or lower one side of the door. The movement may be achieved using a treaded member, a cam, a gear, or the like for pushing or pulling on a translating member that is secured to a single sheave. Moreover, a linear actuator may additionally, or alternatively, be positioned at each cable for such as an adjustment.

Figure 7:
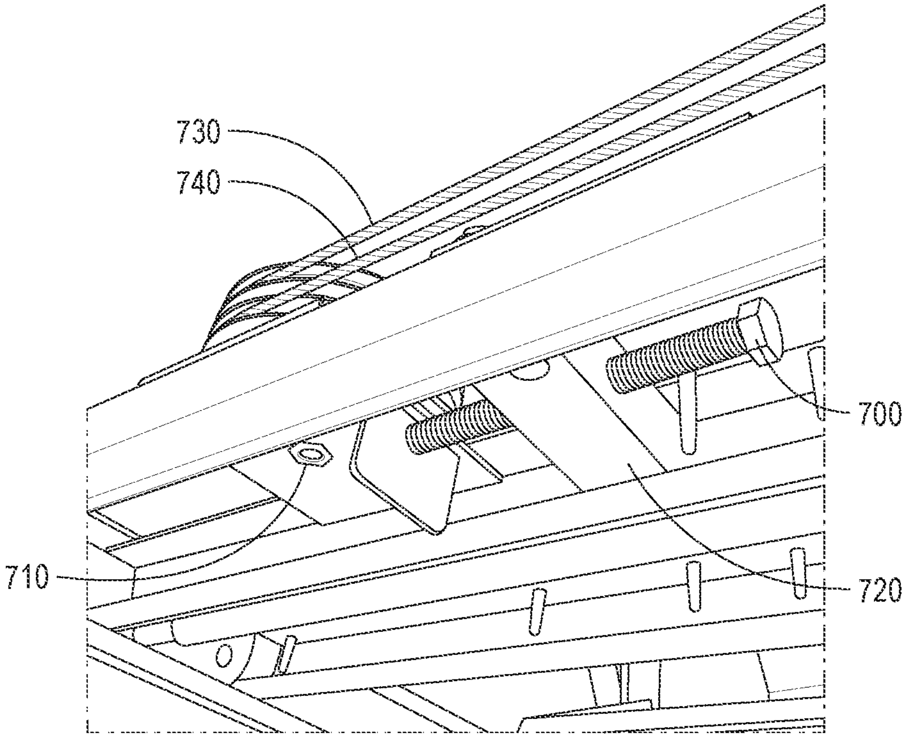
FIG. 7 is an example of an adjustment mechanism in an overhead door assembly, in accordance with an example of the disclosure.

An adjustment mechanism may also be provided to adjust the lift force of the overhead door. In order to set the correct starting position on a gas spring in a counter balance system of the present disclosure the gas spring may be adjusted relative to the floor. This adjustment may occur by adding or subtracting the length of the cable into the system for both sides by adjusting a position of a double sheave (or side-by-side sheave as described above) provided adjacent the gas spring. Movement of the double sheave provided at the gas spring forces the gas spring that lifts from the floor to either further compress or extend (depending on the direction of adjustment of the double sheave relative to the gas spring) which will change the starting position of the gas spring. The movement of the double sheave may be achieved by way of a cam, a threaded portion, a work/ring gear assembly, or the like. The external force that applies to these mechanisms could be manual (e.g., by hand, a drill, a ratchet, or the like) or may occur automatically as noted above (e.g., a linear actuator, thermal actuator, or the like). This adjustment may also be made to passively adjust for temperature. An example of such an adjustment mechanism is illustrated in FIG. 7 where a double sheave 710 (or side-by-side sheave) of a counter balance system is illustrated as being affixed to an adjustable threaded rod 700 that is moved relative to a fixed structure 720. By adjusting the double sheave 710 relative to the threaded rod 720, the length of the cables 730, 740 extending through the double sheave are adjusted and, thereby, adjust the lift of the overhead door relative to the energy storage device relied on in the counter balance system (e.g., gas spring, linear actuator, etc.).

Figure 8:
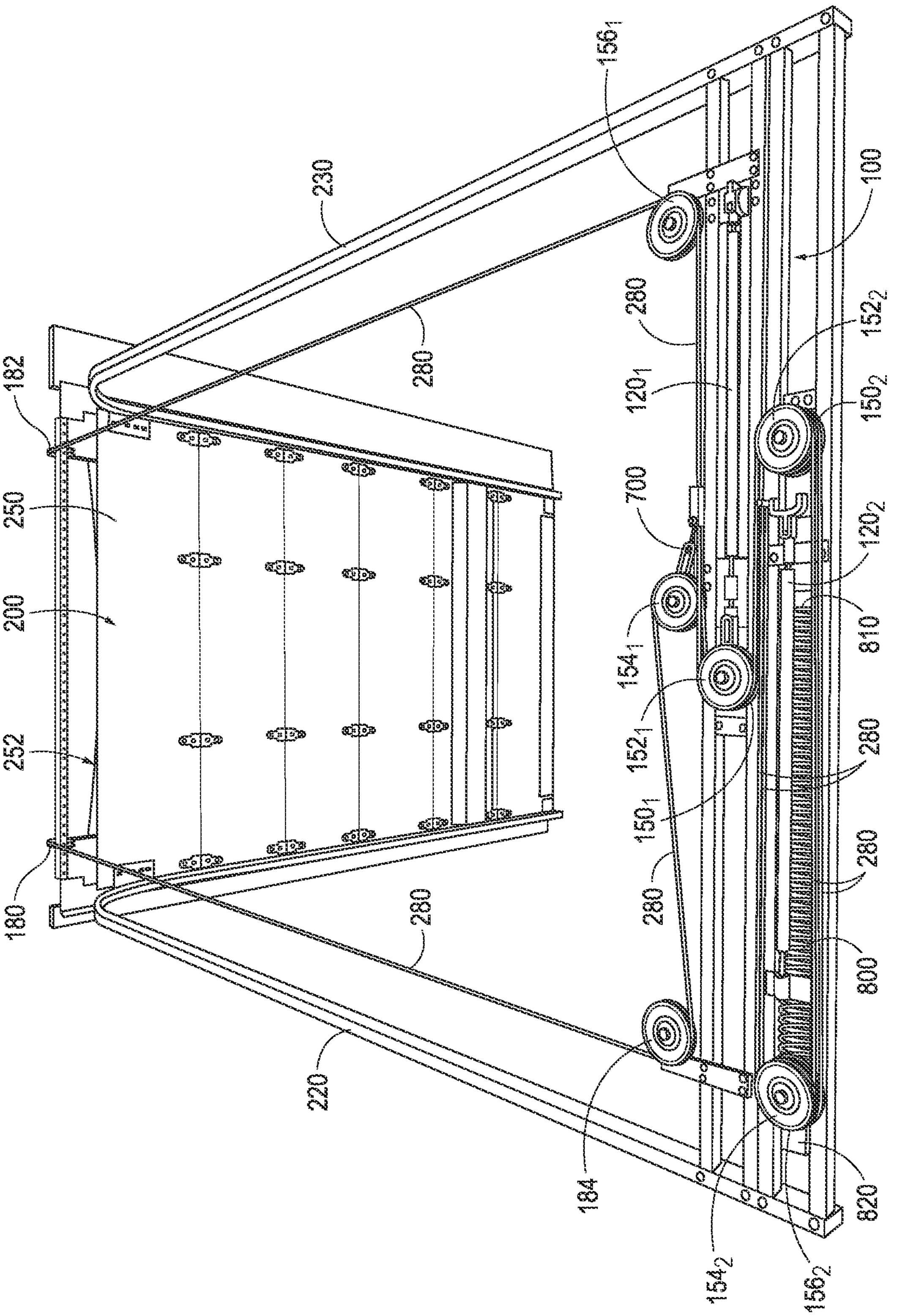
FIG. 8 is a perspective view of a multiple gas spring direct drive counter balance system in an overhead door assembly, in accordance with an example of the disclosure.

Now turning to FIG. 8, an additional, and different, energy storage device is added to a two gas spring counter balance system of the present disclosure. The added energy storage device in this example is a compression spring 800 and is a passive tensioning mechanism. As noted above, an extension spring may be relied on in an inverse arrangement to that illustrated for the compression spring of FIG. 8. In some examples, a passive tensioning mechanism may be a combination of compression or extension springs, a linear actuator, a combination of linear actuators, an additional gas spring, a combination of additional gas springs, a combination of the like, or the like. The compression spring 800 in FIG. 8 acts as a passive adjustment for the operation of the gas springs 120$_1$, 120$_2$ of the counter balance system 100. When preloaded, the compression spring of this example keeps the cable tension constant regardless of the temperature, or other impact on the system that might require adjustment over use (e.g., stretching of a cable, loosening of a cable, etc.). A first end 810 of the compression spring 800 is fixed, or anchored, relative the counter balance system 100 while the second end is fixed to a carriage 820 with one or more tensioning sheaves 154$_2$, 156$_2$ attached thereto. Because the tensioning sheaves move with the carriage 820, the one or more tensioning sheaves 154$_2$, 156$_2$ are amplifying sheaves. In other words, the one or more tensioning sheaves 154$_2$, 156$_2$ move with the carriage 820 by way of the compression spring 800 moving the carriage 820 when required to maintain constant tension on the cable. The cable(s) 280 may be affixed to one side of the tensioning sheaves 154$_2$, 156$_2$ and extend about the sheaves into and through the gas spring 120$_1$, 120$_2$ arrangement of the counter balance system 100. This constant pressure is maintained through the operation of the counter balance system. Moreover, this constant pressure is maintained through temperature fluctuations, or other changes, that may otherwise impact the tension of the components of the system.

Similar to that described with respect to the arrangement of FIGS. 3-4, the first gas spring 120$_1$ of the two gas spring counter balance system 100 of FIG. 8 operates, individually, as the counter balance to the overhead door system 200 upon initial movement, at a first stage of advancement of the overhead door 250. The first stage of advancement in this example is initial movement of the overhead door of 250 the overhead door system 200 from an opened position to the closed position. At a second stage in the advancement of the overhead door 250, or intermediate stage, the second gas spring 120$_2$ of the two gas spring system counter balance system 100 begins to operate and operates in combination with the first gas spring 120$_1$. The second stage of advancement of the overhead door 250 may include movement of the overhead door 250 in a position between the fully open and the fully closed positions. At a third stage of advancement of the overhead door 250, the first gas spring 120$_1$ reaches a limit of operation and ceases to provide assistance, and the second gas spring 120$_2$ continues to operate independent of the first gas spring 120$_1$. The third stage, for example, may occur as the overhead door 250 is approaching the fully open closed from an intermediate position of the second stage.

In FIG. 8, the counter balance system 100 is illustrated within an overhead door assembly 200. The counterbalance system 100 is mounted on the overhead door assembly 200 between tracks 220 and 230 at the top end 252. In this example, the framed structure of the counter balance system 100 is secured to the tracks 220 and 230 of the overhead door assembly. In the example of FIG. 8 and as described above, the cable(s) 280, which are affixed within the system at a first end and extend to the overhead door 250 at the opposite end, extend about tensioning sheaves 154$_2$, 156$_2$ positioned on a carriage 820 that moves, or slides, relative to overhead door assembly 200. This is different than FIGS. 3-4 where sheaves 154$_2$, 156$_2$ are affixed, or anchored, relative to the affixed or anchored end of the first gas spring 120$_1$. In the example of FIG. 8 and as noted above, the tensioning sheaves 154$_2$, 156$_2$ are now amplifying sheaves. The compression spring 800 imparts a force on the carriage 820 to move the carriage 820 and, thereby, to maintain the cable(s) 280 in constant tension as the cable(s) 280 through the counter balance system 100 and overhead door system 200. In other words, the compression spring 800 acts as a passive adjustment to the counter balance system 100 maintaining the constant tension the cable(s) 280. In the overhead door system 200, The cable(s) 280 advance about the respective tensioning sheaves 154$_2$, 156$_2$ into the counter balance system 100 about amplifying sheaves 150$_1$, 150$_2$, 152$_1$, 152$_2$ of each respective gas spring 120$_1$, 120$_2$ of the counter balance system 100 and through respective directional sheaves 154$_1$, 156$_1$ and operate as described with respect to FIGS. 3-4 through the compound pulley system 170 comprising a combination of directional sheaves 180, 182, 184.

In FIG. 8, an example of an adjustment mechanism 700 such as, for example, the adjustment mechanism 700 of FIG. 7 is illustrated within the overhead door system. Instead, of a threaded rod of FIG. 7, the adjustment mechanism 700 of FIG. 8 is a turnbuckle, but may be any other device which provides adjustment such as, for example, the threaded rod of FIG. 7, or the like. In FIG. 8, the adjustment mechanism 700 may be adjusted to adjust the location of the directional sheave 154$_1$ and, thereby, further adjust the tension of the cable within the system. Such an adjustment mechanism may be provided at any component within the system and is provided at the directional sheave 154$_1$ for illustration of such. Unlike the compression spring 800 of FIG. 8, the adjustment mechanism 700 of FIG. 8 is not a passive adjustment mechanism which operates to provide constant tension by automatically adjusting upon a change to the components or a condition of the components, such as adjustments that may be required due to the impact of changes in temperature on the components. However, a passive adjustment mechanism may be provided.

In one particular example, the above described overhead door systems may be applied to a segmented door for a box truck. In one example, the direct drive counter balance system may be provided as an alternative to existing counter balance systems in new box trucks. In other examples, the direct drive counter balance system may be provided to replace existing counter balance systems in existing box trucks, as a retrofit. The advantages provided to segmented doors for box trucks include increased cycles during the operational lifespan, reduced maintenance, reduced downtime, elimination of fatigue otherwise exhibited by torsion springs, elimination of winding or spooling about a drum, and/or providing for an improved control of motion. Also, as noted above, examples of the direct drive system include a system where, even upon a partial failure, the door may remain operational, thereby, providing the box truck operator the opportunity to complete deliveries before pursuing maintenance.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A counter balance system for an overhead door assembly, the counter balance system comprising:

a gas spring where a first end of the gas spring is configured to be fixed to an overhead door assembly and a second end is configured to move relative to the overhead door assembly;

at least a first sheave secured to, or adjacent to, the first end of the gas spring and at least a second sheave is secured to the second end of the gas spring and a cable operating over the first sheave and the second sheave and is configured to be operably connected to an overhead door of the overhead door assembly;

wherein the compression of a stroke of the gas spring is adjustable; and wherein the counter balance system does not include a drum system.

2. The counter balance system of claim 1, wherein the cable is configured to be operably connected to an overhead door of the overhead door assembly and the gas spring through a direct drive system wherein there is a dedicated amplifying sheave of the gas spring driving the cable.

3. The counter balance system of claim 1, wherein the adjustment to the compression of the stroke of the gas spring is a passive system that is adjusted while the overhead door is in operation.

4. The counter balance system of claim 1, wherein an adjustment mechanism is provided on the cable to adjust a tension of the cable.

5. The counter balance system of claim 1 further comprising:

a second gas spring wherein a first end of the second gas spring is configured to be fixed to the overhead door assembly and a second end is configured to move relative to the overhead door assembly;

the second gas spring comprising at least a first sheave secured to, or adjacent to, the first end of the second gas spring and at least a second sheave is secured to the second end of the second gas spring;

wherein the cable operates over the first sheave of the second gas spring and the second sheave of the second gas spring.

6. A door for a box truck comprising:

a counter balance system comprising a gas spring where a first end of the gas spring is fixed to an overhead door assembly and the second end moves relative to the overhead door assembly;

at least a first sheave secured to, or adjacent to, the first end of the gas spring and at least a second sheave secured to the second end of the gas spring and a cable operating over the first sheave and the second sheave and is configured to be operably connected to an overhead door of the overhead door assembly;

wherein the compression of a stroke of the gas spring is adjustable; and wherein the counter balance system does not include a drum system.

7. The door of claim 6, wherein the cable is configured to be operably connected to an overhead door of the overhead door assembly and the gas spring through a direct drive system wherein there is a dedicated amplifying sheave of the gas spring driving the cable.

8. The door of claim 6, wherein the adjustment to the compression of the stroke of the gas spring is a passive system that is adjusted while the overhead door is in operation.

9. The door of claim 6, wherein an adjustment mechanism is provided on the cable to adjust a tension of the cable.

10. The segmented door of claim 6 further comprising:

a second gas spring wherein a first end of the second gas spring is configured to be fixed to the overhead door assembly and a second end is configured to move relative to the overhead door assembly;

the second gas spring comprising at least a first sheave secured to, or adjacent to, the first end of the second gas spring and at least a second sheave is secured to the second end of the second gas spring;

wherein the cable operates over the first sheave of the second gas spring and the second sheave of the second gas spring.

11. A counter balance system for an overhead door assembly, the counter balance system comprising:

a gas spring where a first end of the gas spring is configured to be fixed to an overhead door assembly and a second end is configured to move relative to the overhead door assembly;

at least a first sheave secured to, or adjacent to, the first end of the gas spring and at least a second sheave is secured to the second end of the gas spring and a cable operating over the first sheave and the second sheave and is configured to be operably connected to an overhead door of the overhead door assembly;

wherein the compression of a stroke of the gas spring is adjustable; and wherein an electrically operated linear actuator adjusts the stroke of the gas spring.

12. The counter balance system of claim 11, wherein the counter balance system does not include a drum system.

13. A door for a box truck comprising:

a counter balance system comprising a gas spring where a first end of the gas spring is fixed to an overhead door assembly and the second end moves relative to the overhead door assembly;

at least a first sheave secured to, or adjacent to, the first end of the gas spring and at least a second sheave secured to the second end of the gas spring and a cable operating over the first sheave and the second sheave and is configured to be operably connected to an overhead door of the overhead door assembly;

wherein the compression of a stroke of the gas spring is adjustable; and wherein an electrically operated linear actuator adjusts the stroke of the gas spring.

14. The door of claim 13, wherein the counter balance system does not include a drum system.

* * * * *